US012768983B1

(12) United States Patent
Chang et al.

(10) Patent No.: US 12,768,983 B1
(45) Date of Patent: Oct. 20, 2026

(54) FUSING OBJECTS DETECTED BY RADAR WITHOUT HEIGHT INFORMATION TO THE OBJECT CAPTURED BY A SINGLE LENS CAMERA

(71) Applicant: Ambarella International LP, Santa Clara, CA (US)

(72) Inventors: Chih-Hao Chang, Taichung City (TW); Tze-Ching Chuang, Taipei City (TW); Hsin-Hao Chang, Zhubei City (TW)

(73) Assignee: Ambarella International LP, Santa Clara, CA (US)

( * ) Notice: Subject to any disclaimer, the term of this patent is extended or adjusted under 35 U.S.C. 154(b) by 386 days.

(21) Appl. No.: 18/237,564

(22) Filed: Aug. 24, 2023

Related U.S. Application Data

(63) Continuation-in-part of application No. 18/232,623, filed on Aug. 10, 2023, now Pat. No. 12,504,530.

(51) Int. Cl.
*G01S 13/86* (2006.01)
*G01S 13/89* (2006.01)
(Continued)

(52) U.S. Cl.
CPC ............ *G01S 13/867* (2013.01); *G01S 13/89* (2013.01); *G06T 7/20* (2013.01); *G06T 7/30* (2017.01); *G06T 7/60* (2013.01); *G06T 7/70* (2017.01); *G06T 2207/10016* (2013.01); *G06T 2207/10044* (2013.01); *G06T 2207/20221* (2013.01)

(58) Field of Classification Search
CPC ......... G01S 13/867; G01S 13/89; G06T 7/20; G06T 7/30; G06T 7/60; G06T 7/70; G06T 2207/10016; G06T 2207/10044; G06T 2207/20221
See application file for complete search history.

(56) References Cited

U.S. PATENT DOCUMENTS

2014/0333467 A1* 11/2014 Inomata ................ G01S 13/726 342/104
2017/0242117 A1* 8/2017 Izzat ....................... G01S 17/66
(Continued)

FOREIGN PATENT DOCUMENTS

CN 115346368 A * 11/2022 ........... G08G 1/0125

*Primary Examiner* — Edward Park
*Assistant Examiner* — Alexander Joseph Vaughn
(74) *Attorney, Agent, or Firm* — Ambarella International LP

(57) ABSTRACT

An apparatus comprising an interface and a processor. The interface may be configured to receive pixel data and radar data. The processor may be configured to process the pixel data arranged as video frames, receive coordinate transformation data for an image sensor and a radar device, determine a first object detection location in the video frames in response to computer vision operations, determine a second object detection location in the radar data, determine if there is an intersection of the first object detection location and the second object detection location in response to a comparison of a transformation of the first object detection location and the second object detection location to an aligned coordinate system, and generate information about an object in response to the intersection. The coordinate transformation may be performed to compare the aligned coordinate system. The intersection is determined according to matching rules.

19 Claims, 16 Drawing Sheets

(51) Int. Cl.
*G06T 7/20* (2017.01)
*G06T 7/30* (2017.01)
*G06T 7/60* (2017.01)
*G06T 7/70* (2017.01)

(56) References Cited

U.S. PATENT DOCUMENTS

2022/0319328 A1* 10/2022 Zhang .................... G06V 20/56
2023/0370709 A1* 11/2023 Ozone .................... G06V 10/75
2024/0291993 A1* 8/2024 Diedrich .............. H04N 19/167

* cited by examiner

FUSING OBJECTS DETECTED BY RADAR WITHOUT HEIGHT INFORMATION TO THE OBJECT CAPTURED BY A SINGLE LENS CAMERA

This application relates to U.S. application Ser. No. 18/232,623, filed on Aug. 10, 2022, which is hereby incorporated by reference in its entirety.

FIELD OF THE INVENTION

The invention relates to sensor data generally and, more particularly, to a method and/or apparatus for implementing fusing objects detected by radar without height information to the object captured by a single lens camera.

BACKGROUND

Devices are increasingly being equipped with various types of sensors. Each sensor is capable of generating data. Each data type generated by a sensor when interpreted alone provides a limited amount of information. Sensor fusion combines disparate sources of data to provide insight that would not be available from one data type alone. Each data type generated by a particular type of sensor (i.e., image data, radar data, temperature data, audio data, etc.) can complement other data types and address shortcomings of the various data types.

Fusing radar data with image data is one type of sensor fusion. Radar data can provide a high resolution of three dimensional positional information in various visibility conditions but does not provide visual details. Image data can provide high resolution visual detail but is limited in low visibility environments and provides two dimensional data. Fusing radar data with image data provides a rich data source.

Radar data and image data each provide large amounts of data that results in a large amount of data processing. Many use-cases for fusing radar data and image data are real-time applications, which require the high volume of data to be processed quickly. In order for radar data and image data to be useful together, both types of data need to be analyzed on a common basis (i.e., correlated to the real-world environment). Physical variations (i.e., individual lens distortions, device characteristics, operating specification, operating tolerances, etc.) adds an additional layer of difficulty in fusing the data because each sensor can behave differently even in the same product line.

It would be desirable to implement fusing objects detected by radar without height information to the object captured by a single lens camera.

SUMMARY

The invention concerns an apparatus comprising an interface and a processor. The interface may be configured to receive pixel data and radar data. The processor may be configured to process the pixel data arranged as video frames, receive coordinate transformation data for an image sensor and a radar device, determine a first object detection location in the video frames in response to computer vision operations, determine a second object detection location in the radar data, determine if there is an intersection of the first object detection location and the second object detection location in response to a comparison of a transformation of the first object detection location and the second object detection location to an aligned coordinate system, and generate information about an object in response to the intersection. The coordinate transformation may be performed on the first object detection location and the second object detection location to compare the first object detection location and the second object detection location on the aligned coordinate system. The intersection is determined according to matching rules.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
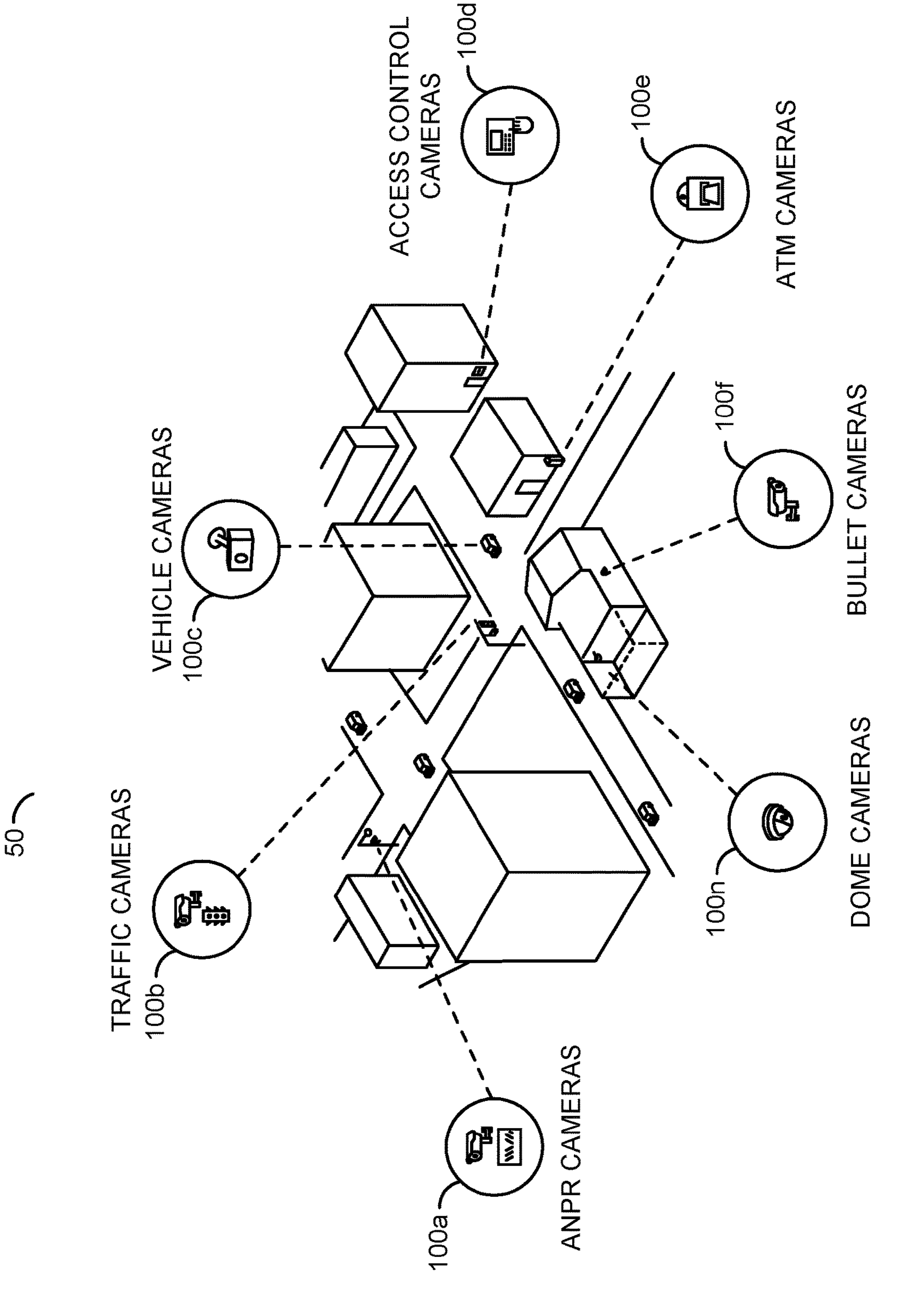
FIG. 1 is a diagram illustrating examples of edge devices that may utilize a processor configured to implement fusing objects detected by radar without height information to the object captured by a single lens camera.

Embodiments of the present invention include providing fusing objects detected by radar without height information to the object captured by a single lens camera that may (i) be implemented on an edge device comprising both an image sensor and a radar module, (ii) be implemented for an image sensor on a separate device from a radar module, (iii) align a region of interest from radar to a region of interest from an image, (iv) provide matching rules for radar data and computer vision results on the same coordinate system, (v) generate range data of a detected object, (vi) generate height data of a detected object based on a highest point of a computer vision detection window, (vii) generate velocity data of a detected object, (viii) distinguish between a live object and a 2D representation of an object, (ix) distinguish between a moving object and a stationary object and/or (x) be implemented as one or more integrated circuits.

Embodiments of the present invention may be configured to enable sensor fusion of image data and radar data in response to a calibration of a camera and a radar device. In an example, the camera may comprise a single lens camera. In an example, the radar device may be a mmWave radar. For example, the mmWave radar may be a non automotive radar. The field of view (FoV) of the radar may be fused with the FoV used for computer vision.

Fusing the FoV of the radar with the FoV used for computer vision may enable a region of interest (ROI) of the image to be determined based on a presence of objects detected by the radar. The radar data may provide additional information that may add context to the image data. In one example, using an aligned ROI determined using the radar data, processing of the image may be limited to the ROI of the image (e.g., where both the ROI of the radar data and the ROI of the image data intersect). Performing image processing on the ROI rather than a full video frame may reduce an amount of processing performed on the image. In another example, bitrate control may be based on the aligned ROI. In yet another example, exposure adjustments may be determined based on the aligned ROI. In still another example, image signal processing enhancements (e.g., using a neural network for image signal processing) and/or other video/image quality control features may be performed based on the aligned ROI. The various types of processing performed using the aligned ROI may be varied according to the design criteria of a particular implementation.

Embodiments of the present invention may be configured to use coordinate transformation data previously determined for the edge device(s) (e.g., an image sensor and/or a radar module) for generating an aligned ROI at runtime. Calibration and/or correction techniques may be performed on the image sensor and/or the radar module. The calibration and/or correction techniques may be implemented to reduce as many errors as possible that may be intrinsic to the particular device (e.g., correct errors that may be unique to the device, determine an optical center of the device, etc.). The calibration and/or correction techniques may be implemented to reduce as many errors as possible in various aspects of fusing the image data with the radar data.

Images and/or video frames may be captured using a single lens camera system. Computer vision operations may be performed on the images and/or video frames to detect an object using computer vision. Simultaneously, radar data may be generated using a mmWave radar device. Radar processing may be performed on the radar data to detect an object. Using the coordinate transformation data, the radar data may be converted to the same image coordinate system of the images and/or video data. Based on the same coordinate system (e.g., the aligned coordinate system), the location of the object detected using computer vision may be compared to the location of the object detected using radar processing (e.g., the computer vision detection window may be compared to the radar detection window). For example, whether the computer vision detection window has an intersection with the radar detection window may be determined. If both the computer vision detection window and the radar detection window intersect, information may be generated about the object detected and/or additional processing may be performed on the region of the image(s) that intersect. If the computer vision detection window and the radar detection window do not intersect, then the object may be ignored.

Matching rules may be used in the aligned coordinate system. For example, the images generated may capture an object in the environment to provide a representation of the object from the real world coordinate system in the image coordinates. The depth data from the radar data may be used with the image coordinate system data to make calculations based on the image coordinates. The real-world coordinate system may be rebuilt based on the image coordinate data and the depth data. In one example, the matching rules may comprise an amount of intersection between the computer vision detection window and the radar detection window (e.g., a percentage threshold of overlap and/or intersection). In another example, the matching rules may comprise detecting an object with depth (e.g., distinguishing between a 3D object and a 2D representation of the object). In yet another example, the matching rules may comprise detecting a movement of an object (e.g., distinguishing between a moving object and a stationary object). The matching rules may be varied according to the design criteria of a particular implementation.

Referring to FIG. 1, a diagram illustrating examples of edge devices that may utilize a processor configured to implement calibrating a single lens camera and a radar for fusing objects detected by radar with objects captured by the single lens camera is shown. An overhead view of an area 50 is shown. In the example shown, the area 50 may be an outdoor location. Streets, vehicles and buildings are shown.

Devices 100*a*-100*n* are shown at various locations in the area 50. The devices 100*a*-100*n* may each implement an edge device. The edge devices 100*a*-100*n* may comprise smart IP cameras (e.g., camera systems) and/or radar modules. The edge devices 100*a*-100*n* may comprise low power technology designed to be deployed in embedded platforms at the edge of a network (e.g., microprocessors running on sensors, cameras, or other battery-powered devices), where power consumption is a critical concern. In an example, the edge devices 100*a*-100*n* may comprise various traffic cameras and intelligent transportation systems (ITS) solutions.

The edge devices 100*a*-100*n* may be implemented for various applications. In the example shown, the edge devices 100*a*-100*n* may comprise automated number plate recognition (ANPR) cameras 100*a*, traffic cameras 100*b*, vehicle cameras 100*c*, access control cameras 100*d*, automatic teller machine (ATM) cameras 100*e*, bullet cameras 100*f*, dome cameras 100*n*, etc. In an example, the edge devices 100*a*-100*n* may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100*a*-100*n* may be implemented at various indoor locations. In an example, edge devices 100*a*-100*n* may incorporate a convolutional neural network in order to be utilized in security (surveillance) applications and/or access control applications. In an example, the edge devices 100*a*-100*n* implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. The radar module implemented by the edge devices 100*a*-100*n* may be configured to detect a proximity and/or location of objects/obstacles around the particular edge device. In an example, the radar module may comprise an antenna array that generate raw radar data with sparsity (e.g., low volume data from a relatively low number of antennas). The sparse antenna array may enable a high resolution of data to be acquired with a low module cost.

In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, raw radar data may be generated at a low volume, which may be converted to a high resolution of data. The design, type and/or application performed by the edge devices 100*a*-100*n* may be varied according to the design criteria of a particular implementation.

Figure 2:
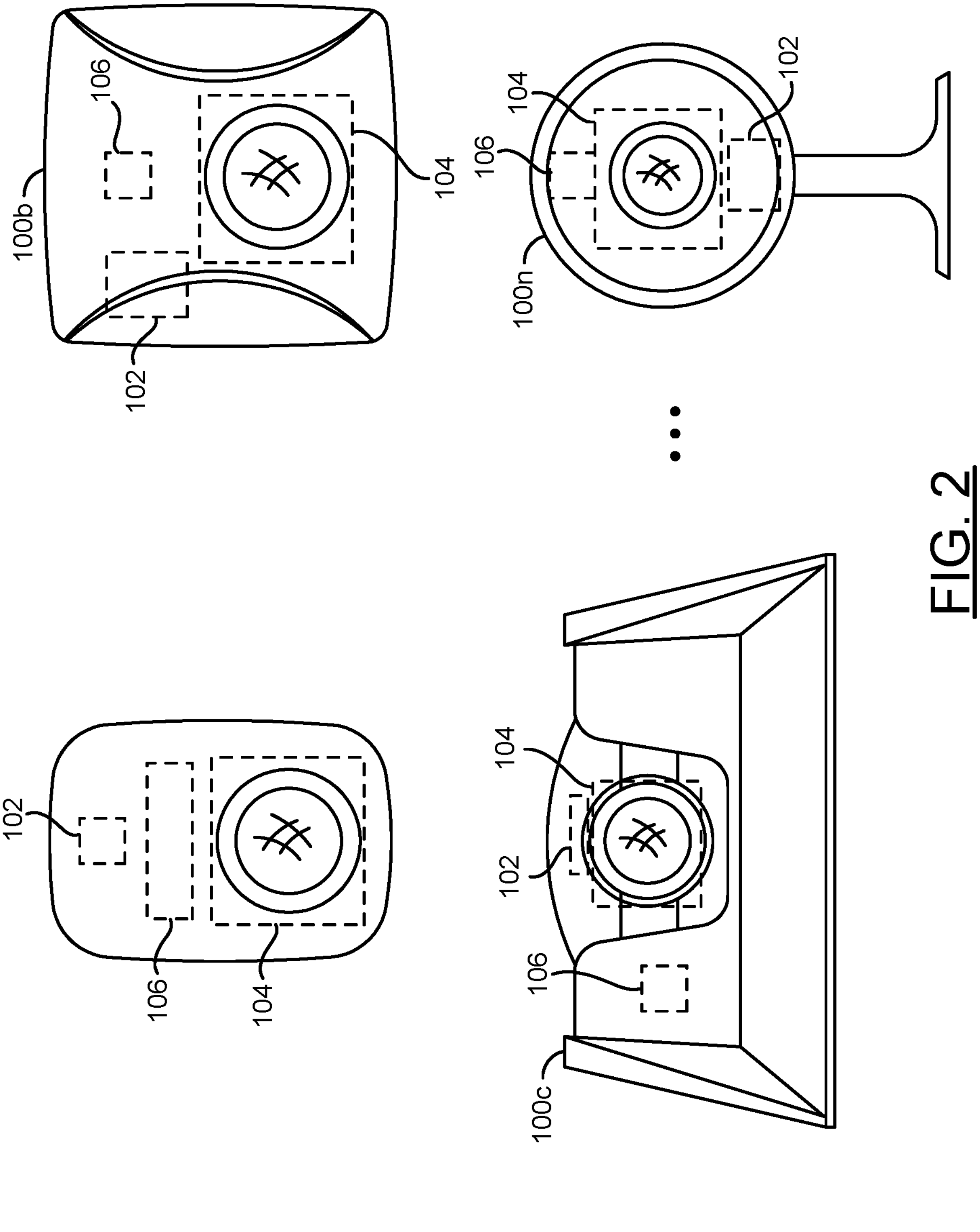
FIG. 2 is a diagram illustrating example cameras implementing an example embodiment of the present invention.

Referring to FIG. 2, a diagram illustrating example cameras implementing an example embodiment of the present invention is shown. The camera systems 100*a*-100*n* are shown. Each camera device 100*a*-100*n* may have a different style and/or use case. For example, the camera 100*a* may be a power over coax model, the camera 100*b* may be a ceiling mounted security camera, the camera 100*n* may be a webcam, etc. Other types of cameras may be implemented (e.g., home security cameras, battery powered cameras, doorbell cameras, stereo cameras, etc.). The design/style of the cameras 100*a*-100*n* may be varied according to the design criteria of a particular implementation.

Each of the camera systems 100*a*-100*n* may comprise a block (or circuit) 102, a block (or circuit) 104 and/or a block (or circuit) 106. The circuit 102 may implement a processor. The circuit 104 may implement a capture device. The circuit 106 may implement a radar module (e.g., a radar frontend). The camera systems 100*a*-100*n* may comprise other components (not shown). Details of the components of the cameras 100*a*-100*n* may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The radar module 106 may be configured to generate radar data. In an example, the radar module 106 may implement a mmWave radar device. While each of the cameras 100*a*-100*n* are shown implementing the radar module 106, some of the cameras 100*a*-100*n* may be implemented without the radar module 106 (e.g., the capture device 104 and the radar module 106 may be implemented on separate devices).

The cameras 100*a*-100*n* may be edge devices. The processor 102 implemented by each of the cameras 100*a*-100*n* may enable the cameras 100*a*-100*n* to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., edge devices 100*a*-100*n* may operate independently from each other). For example, each of the cameras 100*a*-100*n* may individually analyze the pixel data captured and/or the radar data and perform the event/object detection locally. In some embodiments, the cameras 100*a*-100*n* may be configured as a network of cameras (e.g., security cameras that send video data to a central source such as network-attached storage and/or a cloud service). The locations and/or configurations of the cameras 100*a*-100*n* may be varied according to the design criteria of a particular implementation.

The capture device 104 of each of the camera systems 100*a*-100*n* may comprise a single lens (e.g., a monocular camera). In some embodiments, the capture device 104 may be implemented as part of an evaluation kit, along with the radar module 106. In the example shown, the edge devices 100*a*-100*n* are shown as non-automotive cameras. In some embodiments, the edge devices 100*a*-100*n* may be implemented as one or more sensors on a vehicle. Embodiments of the present invention may implement the image sensor (e.g., part of the capture device 104) and the radar module 106 on a single edge device. In some embodiments, the image sensor and the radar module 106 may be implemented on separate devices. The design of the edge device 100*a*-100*n* may be varied according to the design criteria of a particular implementation.

The FoV of the capture device 104 may overlap, or at least partially overlap, with the FoV of the radar module 106. The processor 102 may comprise a video interface and/or a radar interface. The video interface may enable the processor 102 to receive pixel data from the capture device 104. The radar interface may enable the processor 102 to receive raw radar data from the radar module 106. In some embodiments, the capture device 104 may perform processing of the pixel data and provide images and/or video frames to the video interface. In some embodiments, the radar module 106 may perform processing of the raw radar data and provide the radar data to the radar interface. The radar data interface and/or the video data interface may comprise a number of data ports. Additional interfaces (or a unified interface) may be implemented to enable the processor 102 to receive the pixel data, the radar data and/or data from other types of sensors (e.g., audio, infrared light, lidar, etc.). In some embodiments, the edge devices 100*a*-100*n* may comprise multiple capture devices and/or multiple radar modules and the interfaces may be configured to receive the radar data and/or image data from multiple sources.

The radar module 106 may be configured to determine a proximity and/or location of objects/obstacles around the edge devices 100*a*-100*n*. The radar module 106 may be configured as long-range and/or short-range sensors. The radar module 106 may be configured to generate a radar (or probe) signal, which may be reflected back to the radar module 106 by the object(s) near the edge devices 100*a*-100*n*. The reflected data received by the radar module 106 corresponding to the radar signal may be processed and/or analyzed in order to generate data about the objects in the environment near the edge devices 100*a*-100*n*. In some embodiments, the data generated by the radar module 106 may be used by the processor 102 to create a radar mapping of the environment.

The radar module 106 may be configured to emit a radio frequency pattern. The shape, intensity and/or direction of the radio frequency patterns may determine a detection range of the radar module 106. The radio frequency patterns may have a range of approximately 200 meters to 450 meters, with a 150 degree azimuth field of view and a 45 degree elevation field of view. The particular range of the radio frequency patterns may be varied according to the design criteria of a particular implementation.

The radar module 106 may implement an antenna array and/or waveguide network. The antenna array and/or waveguide network implemented by the radar module 106 may enable a sparse antenna array configured to provide information that may be used by the processor 102 to reconstruct a high resolution of data. In an example, the radar module 106 may be configured to generate a dynamic waveform and the processor 102 may use artificial intelligence to learn from and/or adapt to the environment near the edge devices 100*a*-100*n*. The sparse array implemented by the radar module 106 may enable a high resolution of data to be acquired with a low module cost. The radar module 106 may be configured to generate raw radar data at a low volume that may be converted to a high resolution of data while consuming between 3 watts to 10 watts of power. Details of the antenna array and/or waveguide network implemented by the radar module 106 may be described in association with U.S. application Ser. No. 17/945,379, filed on Sep. 15, 2022 and U.S. application Ser. No. 17/958,268, filed on Sep. 30, 2022, appropriate portions of which are incorporated by reference.

In one example, the processor 102 may implement a zone (or domain) processor. The processor 102 may implement a dataflow vector processor. The processor 102 may comprise a neural vector process (NVP) and a general vector processor (GVP). For example, the processor 102 may implement multiple parallel processors, multiple cores and/or particular processors/cores dedicated to particular tasks. In one example, the NVP may be configured to provide artificial intelligence (AI) performance that may enable detection, classification, tracking, etc. In another example, the GVP may be configured to enable computer vision operations, radar processing, floating-point intensive operations, etc.

The processor 102 may be configured to process raw data streams generated by the radar module 106, the capture device 104 and/or other sensors. The processor 102 may be configured to implement deep sensor fusion in order to combine interpretations of the data from the radar module 106 with interpretations of the data from the capture device 104 and/or data inputs from other sensors (not shown) in order to make inferences using multiple sources of data that would not be possible based on one of the data sources alone. In an example, the processor 102 may be configured to interpret the high resolution data generated in response to the low volume data provided by the radar module 106. In another example, the processor 102 may be configured to perform computer vision operations on the video frames generated by the capture device 104 in order to detect objects.

The processor 102 may be configured to implement central compute capabilities that enable high performance without implementing a dedicated processor for the radar module 106. Implementing the processor 102 may enable the radar module 106 to be implemented at a lower cost because a dedicated processor may not be implemented for the radar module 106. The processor 102 may be configured to enable sparsity in the implementation of the radar module 106 in order to determine the boundary conditions for a particular resolution of data. The processor 102 may enable the radar module 106 to undersample the environment while preventing artifacts, grading lobes and/or false alarms.

The processor 102 may be configured to adaptively modulate the information generated by the radar module 106 to enable fewer antennas to be implemented in the antenna array of the radar module 106. Instead of processing data from the radar module 106 at the edge (e.g., one processor on-board with the same technology node for the radar module 106), the sparse (e.g., low volume) raw radar data from the radar module 106 may be processed by the processor 102. The sparse antenna array implemented by the radar module 106 may enable low bandwidth data to be transmitted from the radar module 106 to the processor 102. The processor 102 may be configured to expand the resolution of the data received from the radar module 106.

The processor 102 may utilize a dynamic adaptive waveform. The processor 102 may learn and/or adapt to the environment. The processor 102 may take advantage of sparsity to capture the boundary conditions for the data that may be used for providing a particular resolution. Sparsity may undersample the environment. To avoid grading lobes and/or artifacts that may result from multiple solutions that may be available for reconstructing a dense amount of data using sparsity, an adaptive waveform may be implemented. The adaptive waveform used for the radio frequency patterns may provide a shifting waveform that may be effectively controlled in a deterministic fashion. By adaptively modulating the information, fewer antennas may be used by the radar module 106. Artifacts from the sparsity may be suppressed by aggregating information that may be adaptive over time. The adaptive waveform implemented may provide a sparse radar data cube that may enable reconstructing a high resolution of radar detections that no longer scales with the number of antennas implemented by the radar module 106. The high resolution of the radar detections may scale with how efficiently the processor 102 performs computations and/or how quickly a phase may be modulated onto the adaptive transmitted signal.

Figure 3:
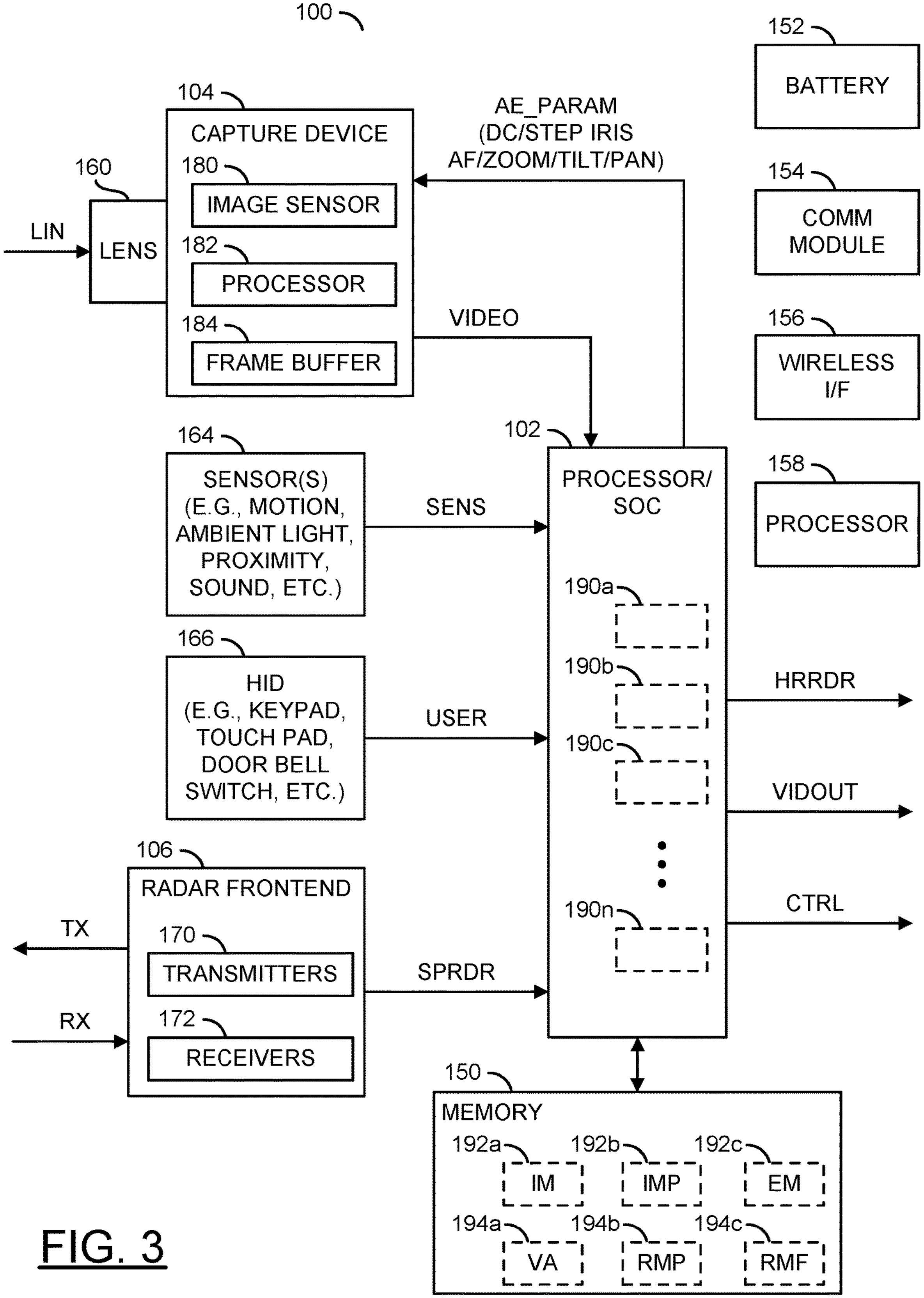
FIG. 3 is a block diagram illustrating a camera/radar system.

Referring to FIG. 3, a block diagram illustrating a camera/radar system is shown. The apparatus 100 may be a representative example of the edge devices shown in association with FIGS. 1-2. The apparatus 100 may comprise the capture device 104, the radar module 106 and/or the processor/SoC 102. The apparatus 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the apparatus 100 may comprise the processor/SoC 102, the capture device 104, the radar module 106, the memory 150, the lens 160, the sensors 164, the battery 152, the communication module 154, the wireless interface 156 and the processor 158. In another example, the apparatus 100 may comprise processor/SoC 102, the capture device 104, the processor 158, the lens 160, and the sensors 164 as one device, and the memory 150, the battery 152, the communication module 154, and the wireless interface 156 may be components of a separate device. The apparatus 100 may comprise other components (not shown). The number, type and/or arrangement of the components of the apparatus 100 may be varied according to the design criteria of a particular implementation.

The processor 102 may be implemented as a dataflow vector processor. The processor 102 may be configured to perform image/video processing and/or radar signal processing. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be configured to generate high resolution radar data.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, metadata information, radar data cubes, radar detections, etc. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In another example, the memory 150 may store one or more directed acyclic graphs (DAGs) and one or more sets of weights and biases defining the one or more artificial neural network models. In yet another example, the memory 150 may store instructions to perform transformation operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the apparatus 100. The dynamic driver mechanism for a rolling shutter sensor may be configured to conserve power consumption. Reducing the power consumption may enable the apparatus 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, a coaxial interface, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the apparatus 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the apparatus 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the apparatus 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the apparatus 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the dataflow vector processor 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the apparatus 100 (e.g., the battery 152, the communication module 154 and/or the wireless interface 156). Which of the functionality of the apparatus 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the apparatus 100 (e.g., a view for a video frame, a view for a panoramic video frame captured using multiple implementations of the apparatus 100 (e.g., 100*a*-100*n*), a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

The radar module 106 may comprise a block (or circuit) 170 and/or a block (or circuit) 172. The circuit 170 may implement a transmitter. The circuit 172 may implement a receiver. The radar module 106 may comprise other components (not shown). The number, type and/or arrangement of the components of the radar module 106 may be varied according to the design criteria of a particular implementation.

The transmitter 170 of the radar module 106 may be configured to generate a signal (e.g., TX). The signal TX may be output signals transmitted to the environment. In an example, the signal TX may be a probe signal. The probe signal TX may comprise individual waveform characteristics. In an example, a first probe signal TX generated by the transmitter 170 of the radar module 106 may comprise a first distinct (or unique or predefined) waveform characteristic, then a second probe signal TX generated by the transmitter 170 of the radar module 106 may comprise a second distinct (or unique or predefined) waveform, etc. In some embodiments, the probe signal TX may cycle through a predefined set of a number of distinct waveform characteristics. The types of the probe signal TX generated may be varied according to the design criteria of a particular implementation.

The transmitter 170 may comprise a waveform generation module, a modulation/coding module and/or a power amplification module. The waveform generation module may be configured to generate the probe signal TX comprising the various waveform characteristics. The modulation/coding module may be configured to select a communication frequency for the waveform characteristics for the probe signals TX. In an example, the modulation/coding module may select a high frequency carrier signal and/or channel for communicating the probe signal TX. The power amplification module may be configured to provide a power level for the probe signal TX. For example, in response to the power level selected by the power amplification module and the frequency selected by the modulation/coding module, the waveform generation module may output the probe signal TX from the transmitter 170 with the distinct waveform characteristics.

The receiver 172 of the radar module 106 may be configured to receive a signal (e.g., RX) and/or generate a signal (e.g., SPRDR). The signal RX may be input signals received from the environment. In an example, each of the probe signals TX may be reflected back from objects in the environment and received as the reflected signals RX. The receiver 172 may be configured to perform various operations on the reflected signals RX. For example, the operations performed by the receiver 172 may enable the various waveform characteristics of the transmitted signal TX to be extracted and/or isolated in the reflected signal RX. The reflected signal RX may correspond to the waveform characteristics of the probe signals TX.

The signal SPRDR may comprise raw radar data generated by the receiver 172. The operations performed by the receiver 172 may be configured to generate the raw radar data SPRDR in response to the reflected signal RX. Generally, the raw radar data SPRDR may comprise a low volume of data. For example, the low volume of data of the raw radar data SPRDR may be enabled because of the sparsity of the antenna arrays of the transmitter 170 and the receiver 172. In one example, the antenna arrays implemented by the transmitter 170 and/or the receiver 172 implementing the sparse antenna array may comprise twelve antenna heads. The raw radar data SPRDR may be transmitted to the data network. The signal SPRDR may be presented by the radar module 106 to the processor 102.

The receiver 172 may comprise an analog to digital conversion (ADC), a demodulation module and/or a signal conditioning module. The ADC and/or the demodulation module may be configured to perform analog to digital conversion and/or demodulation operations on the reflected signal RX. The ADC operations may comprise sampling and/or quantization in order to convert the analog reflected signal RX to a digital version that may be operated on digitally. The demodulation operations may be configured to retrieve the waveform characteristics from the reflected signal RX that may have been adapted to a particular transmission channel. In an example, the demodulation operations may extract and/or isolate the waveform characteristics in the reflected signal RX (e.g., the unique characteristics that correspond to the probe signal TX). The signal conditioning module may be configured to prepare the reflected signal RX for communication via a data network of the apparatus 100. For example, in response to waveform characteristics extracted from the reflected signal RX by the demodulation module, the signal conditioning module may output the raw radar data SPRDR from the receiver 172.

In the example shown, transmitter 170 and/or the receiver 172 implemented by the radar module 106 may implement sparsity. For example, the radar module 106 may comprise the transmitters 170 and/or the receivers 172 without implementing a local memory and/or a local processor. For example, the radar module 106 may generate the raw radar data SPRDR with a low data volume, and rely on the centralized processing device 102 to generate a signal (e.g., HRRDR). The signal HRRDR may comprise high resolution data and/or radar detections generated in response to performing the radar signal processing on the raw radar data signal SPRDR.

In some embodiments, the radar module 106 may not implement sparsity. In the example where with the radar module 106 does not implement sparsity, a high volume of raw radar data may be generated. For example, the volume of data in the raw radar data SPRDR generated with sparsity may be less than the high volume of the raw radar data generated without sparsity (e.g., by a factor of sixteen).

The processor 102 may be configured to receive the low volume raw radar SPRDR from the radar module 106 (e.g., at the radar data interface). The processor 102 may be configured to perform virtual aperture imaging. The virtual aperture imaging may be configured to reconstruct high resolution detections based on the each of the sparse raw radar data in the signal SPRDR. The virtual aperture imaging may be configured to use the waveform characteristics in the raw radar data SPRDR in order to generate physical antenna data, extrapolated virtual antenna data and/or interpolated virtual antenna data. For example, the virtual aperture imaging may enable additional data points (e.g., the extrapolated virtual antenna data and/or the interpolated virtual antenna data) to be generated in order to provide a high resolution of data based on the sparse physical antenna data. The virtual aperture imaging may enable a dense array of virtual antenna data to be provided in response to the sparse arrangement of the physical antennas implemented by the radar module 106. Details of the virtual aperture imaging may be described in association with U.S. application Ser. No. 17/832,278 filed on Jun. 3, 2022 (issued as U.S. Pat. No. 11,561,299), U.S. application Ser. No. 17/556,221 filed on Dec. 20, 2021, U.S. application Ser. No. 16/704,409, filed Dec. 5, 2019 (issued as U.S. Pat. No. 11,243,304), U.S. application Ser. No. 16/503,908, filed Jul. 5, 2019 (issued as U.S. Pat. No. 10,564,277), U.S. application Ser. No. 16/032,369, filed Jul. 11, 2018 (issued as U.S. Pat. No. 10,509,119), and U.S. application Ser. No. 15/883,372, filed Jan. 30, 2018 (issued as U.S. Pat. No. 10,048,366), appropriate portions of which are incorporated by reference.

The capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the apparatus 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the apparatus 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102 (e.g., at the video data interface via the data network). The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., the environment captured) and various subjects. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB video signal, an IR video signal and/or an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light. In various embodiments, the image sensor 180 may comprise an RGB sensor, an RGB-IR sensor, an RCCB sensor, a monocular image sensor, stereo image sensors, a thermal sensor, etc.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The capture device 104 may be configured to receive a signal (e.g., AE_PARAM). The signal AE_PARAM may be generated by the processor 102. The signal AE_PARAM may comprise auto exposure parameters generated by the AI metering technique implemented by the processor 102. The processor/logic 182 may be configured to adjust operating parameters of the capture device 104 in response to the signal AE_PARAM. In an example, the processor/logic 182 may adjust an exposure of the image sensor 180 in response to the signal AE_PARAM. In another example, the processor/logic 182 may adjust a DC iris and/or a shutter time for the image sensor 180 in response to the signal AE_PARAM. In yet another example, the processor/logic 182 may adjust a zoom/tilt/pan/focus of the capture device 104 in response to the signal AE_PARAM. In still another example, the processor/logic 182 may adjust the automatic gain control (AGC) of the image sensor 180 in response to the signal AE_PARAM. In some embodiments, the signal AE_PARAM may be configured to provide an activation and/or wakeup signal to the capture device 104. The types of adjustments made in response to the signal AE_PARAM to adjust an exposure, focus and/or capture direction of the capture device 104 may be varied according to the design criteria of a particular implementation.

The sensors 164 may implement a number of sensors including, but not limited to, motion sensors, ambient light sensors, proximity sensors (e.g., ultrasound, passive infrared, lidar, etc.), audio sensors (e.g., a microphone), etc. In embodiments implementing a motion sensor, the sensors 164 may be configured to detect motion anywhere in the field of view monitored by the apparatus 100 (or in some locations outside of the field of view). In various embodiments, the detection of motion may be used as one threshold for activating the capture device 104. The sensors 164 may be implemented as an internal component of the apparatus 100 and/or as a component external to the apparatus 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the apparatus 100. In another example, the sensors 164 may generate (assert) the signal SENS when triggered by audio in the field of view monitored by the apparatus 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. The HID 166 may generate a signal (e.g., USER). The signal USER may provide the input received by the HID 166 to the processor 102. The signal USER may comprise the human input. In one example, the HID 166 may be configured to receive a password input from a user. In another example, the HID 166 may be configured to receive user input in order to provide various parameters and/or settings to the processor 102 and/or the memory 150. For example, the signal USER may comprise FFT and/or data size information for the transformation operations. In some embodiments, the apparatus 100 may include a keypad, a touch pad (or screen), a doorbell switch, and/or other human interface devices (HIDs) 166. In an example, the sensors 164 may be configured to determine when an object is in proximity to the HIDs 166. In an example where the apparatus 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO, the signal SPRDR, the signal SENS and/or the signal USER. The processor/SoC 102 may generate one or more radar detection signals HRRDR, video output signals (e.g., VIDOUT) and/or one or more control signals (e.g., CTRL) based on the signal VIDEO, the signal SPRDR, the signal SENS, the signal USER and/or other input. In some embodiments, the signals VIDOUT and CTRL may be generated based on analysis of the signal VIDEO and/or objects detected in the signal VIDEO. In some embodiments, the signals HRRDR and CTRL may be generated based on radar signal processing of the signal SPRDR and/or radar detections in the signal SPRDR. In some embodiments, the signals HRRDR, VIDOUT and CTRL may be generated based on centralized sensor fusion operations performed in response to a combination of the video analysis of the signal VIDEO, the radar signal processing of the signal SPRDR and/or other sensor data.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal comprising disparity maps and depth maps from the signal VIDEO. The video output signal VIDOUT and/or the depth data may be presented to the memory 150, the communications module 154, and/or the wireless interface 156. In some embodiments, the video signal VIDOUT and/or the depth data may be used internally by the processor 102 (e.g., not presented as output).

The signal HRRDR and/or the signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal HRRDR and/or the signal VIDOUT may be data generated by the processor 102 (e.g., video analysis results, audio/speech analysis results, radar processing analysis, etc.) that may be communicated to a cloud computing service in order to aggregate information and/or provide training data for machine learning (e.g., to improve object detection, to improve audio detection, to improve liveness detection, etc.). In some embodiments, the signal HRRDR and/or the signal VIDOUT may be provided to a cloud service for mass storage (e.g., to enable a user to retrieve the encoded video using a smartphone and/or a desktop computer). In some embodiments, the signal HRRDR and/or the signal VIDOUT may comprise the data extracted from the video frames (e.g., the results of the computer vision) and/or radar signal processing, and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal HRRDR and/or the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on objects and/or distances to objects detected in response to the radar signal processing performed by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The multi-step approach to activating and/or disabling the capture device 104 and/or the radar module 106 based on the output of the motion sensor 164 and/or any other power consuming features of the apparatus 100 may be implemented to reduce a power consumption of the apparatus 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics and/or the radar signal processing performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The apparatus 100 may be configured to operate using various power states. For example, in the power-down state (e.g., a sleep state, a low-power state) the motion sensor of the sensors 164 and the processor/SoC 102 may be on and other components of the apparatus 100 (e.g., the image capture device 104, the radar module 106, the memory 150, the communications module 154, etc.) may be off. In another example, the apparatus 100 may operate in an intermediate state. In the intermediate state, the image capture device 104 and/or the radar module 106 may be on and the memory 150 and/or the communications module 154 may be off. In yet another example, the apparatus 100 may operate in a power-on (or high power) state. In the power-on state, the sensors 164, the processor/SoC 102, the capture device 104, the radar module 106, the memory 150, and/or the communications module 154 may be on. The apparatus 100 may consume some power from the battery 152 in the power-down state (e.g., a relatively small and/or minimal amount of power). The apparatus 100 may consume more power from the battery 152 in the power-on state. The number of power states and/or the components of the apparatus 100 that are on while the apparatus 100 operates in each of the power states may be varied according to the design criteria of a particular implementation.

In some embodiments, the apparatus 100 may be implemented as a system on chip (SoC). For example, the apparatus 100 may be implemented as a printed circuit board comprising one or more components. The apparatus 100 may be configured to perform intelligent video analysis on the video frames of the video. The apparatus 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the apparatus 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the radar module 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the apparatus 100. However, the computer vision operations performed using the feature set may be performed using the computational resources of the processor 102 within the apparatus 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. The processor 102 may comprise a neural vector processor and a general vector processor. In one example, the neural vector processor may be configured to provide AI performance that may enable detection, classification, tracking, etc. In another example, the general vector processor may be configured to enable computer vision operations, radar processing, floating-point intensive operations, etc. In some embodiments, other processors implemented by the apparatus 100 may be generic processors and/or video processors (e.g., a coprocessor that is physically a different chipset and/or silicon from the processor 102).

In some embodiments, the processor 102 may implement an image signal processor that may enable multi-exposure, line-interleaved high dynamic range (HDR), real time multi-scale/multi-field of view (FoV) generation, hardware dewarping engine support, multiple camera support, support for RGGB/RCCB/RCCC/RGB-IR/monochrome sensors, etc. In some embodiments, the processor 102 may implement a dense stereo and optical flow engine configured to implement generic obstacle detection, terrain modeling, etc. In some embodiments, the processor 102 may implement a graphics processing unit configured as an automotive GPU for 3D surround-view rendering and/or generating output to a display (e.g., an infotainment unit). In some embodiments, the processor 102 may support hardware for high-efficiency video encoding such as H.265, H.264, MJPEG, etc. video encoding and provide flexible multi-streaming capability. In some embodiments, portions of the processing may be isolated to provide functional safety (e.g., a processing island targeted to meet ASIL B specifications, a safety island targeted to meet ASIL D specifications, error correcting code (ECC) protection of DRAM, a central error handling unit (CEHU), etc.). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) **190*a*-190*n*. The blocks 190*a*-190*n* may implement various hardware modules implemented by the processor 102. The hardware modules 190*a*-190*n* may be configured to provide various hardware components to implement a video processing pipeline, a radar signal processing pipeline and/or an AI processing pipeline. The circuits 190*a*-190*n* may be configured to receive the pixel data VIDEO, generate the video frames from the pixel data, perform various operations on the video frames (e.g., dewarping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190***a*-190*n* may be configured to implement various security features (e.g., secure boot, I/O virtualization, etc.). Various implementations of the processor 102 may not necessarily utilize all the features of the hardware modules 190*a*-190*n*. The features and/or functionality of the hardware modules 190*a*-190*n* may be varied according to the design criteria of a particular implementation. Details of the hardware modules 190*a*-190*n* may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600) U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190*a*-190*n* may be implemented as dedicated hardware modules. Implementing various functionality of the processor 102 using the dedicated hardware modules 190*a*-190*n* may enable the processor 102 to be highly optimized and/or customized to limit power consumption, reduce heat generation and/or increase processing speed compared to software implementations. The hardware modules 190*a*-190*n* may be customizable and/or programmable to implement multiple types of operations. Implementing the dedicated hardware modules 190*a*-190*n* may enable the hardware used to perform each type of calculation to be optimized for speed and/or efficiency. For example, the hardware modules 190*a*-190*n* may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190*a*-190*n* may enable computationally intensive operations (e.g., computer vision operations, video encoding, video transcoding, 3D reconstruction, depth map generation, liveness detection, etc.) to be performed locally by the apparatus 100.

One of the hardware modules 190*a*-190*n* (e.g., 190*a*) may implement a scheduler circuit. The scheduler circuit 190*a* may be configured to store a directed acyclic graph (DAG). In an example, the scheduler circuit 190*a* may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190*a* may be configured to parse the acyclic graph to generate various operators. The operators may be scheduled by the scheduler circuit 190*a* in one or more of the other hardware modules 190*a*-190*n*. For example, one or more of the hardware modules 190*a*-190*n* may implement hardware engines configured to perform specific tasks (e.g., hardware engines designed to perform particular mathematical operations that are repeatedly used to perform computer vision operations). The scheduler circuit 190*a* may schedule the operators based on when the operators may be ready to be processed by the hardware engines 190*a*-190*n*.

The scheduler circuit 190*a* may time multiplex the tasks to the hardware modules 190*a*-190*n* based on the availability of the hardware modules 190*a*-190*n* to perform the work. The scheduler circuit 190*a* may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190*b* may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/ model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

One or more of the hardware modules 190*a*-190*n* may be configured to implement other types of AI models. In one example, the hardware modules 190*a*-190*n* may be configured to implement an image-to-text AI model and/or a video-to-text AI model. In another example, the hardware modules 190*a*-190*n* may be configured to implement a Large Language Model (LLM). Implementing the AI model (s) using the hardware modules 190*a*-190*n* may provide AI acceleration that may enable complex AI tasks to be performed on an edge device such as the edge devices 100*a*-100*n*.

One of the hardware modules 190*a*-190*n* may be configured to perform the virtual aperture imaging. One of the hardware modules 190*a*-190*n* may be configured to perform transformation operations (e.g., FFT, DCT, DFT, etc.). The number, type and/or operations performed by the hardware modules 190*a*-190*n* may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogenous processing resources (all circuits 190*a*-190*n* may have the same capabilities) or heterogeneous processing resources (two or more circuits 190*a*-190*n* may have different capabilities).

The memory 150 may comprise a number of blocks 192*a*-192*c* and/or a number of blocks 194*a*-194*c*. The blocks 192*a*-192*c* and/or the blocks 194*a*-194*c* may comprise data storage. While the data storage 192*a*-192*c* and/or the data storage 194*a*-194*c* are shown as individual discrete blocks as an illustrative example, the various data stored in the data storage 192*a*-192*c* and/or the data storage 194*a*-194*c* may be stored throughout the memory 150. While the data storage 192*a*-192*c* and the data storage 194*a*-194*c* are shown, the memory 150 may store additional data (not shown). The amount of data stored, the storage format and/or the type of data stored by the data storage 192*a*-192*c* and/or the data storage 194*a*-194*c* may be varied according to the design criteria of a particular implementation.

The data storage 192*a*-192*c* may comprise camera correction data. The camera correction data 192*a*-192*c* may be configured to implement an image coordinate transformation (e.g., to convert from an image coordinate system of the images and/or video frames to a real-world coordinate system of the environment). The camera correction data 192*a* may comprise an intrinsic matrix (e.g., for correcting errors caused by physical characteristics of the capture device 104 and/or for determining an optical center of the capture device 104). The camera correction data 192*b* may comprise image mapping points (e.g., to establish a correlation between image coordinates and real world coordinates). The camera correction data 192*c* may comprise an extrinsic matrix (e.g., transfer and/or project image coordinates to real world coordinates). The camera correction data 192*a*-192*c* may be generated during a prepare stage (e.g., offline, at a manufacturing time, before a runtime, etc.) and used during a runtime of the capture device 104. For example, the processor 102 may access the camera correction data 192*a*-192*c* to perform the image coordinate transformation.

The data storage 194*a*-194*c* may comprise radar correction data. The radar correction data 194*a*-194*c* may be configured to implement a radar coordinate transformation (e.g., to convert from a radar coordinate system of the radar data to the image coordinate system of the images and/or video frames). The radar correction data 194*a* may comprise a valid area (e.g., to filter invalid data and/or select a data format). The radar correction data 194*b* may comprise radar mapping points (e.g., to bind radar coordinates to the image coordinates to create a mapping function). The radar correction data 194*c* may comprise a radar mapping function (e.g., to transform radar coordinates to image coordinates). The radar correction data 194*a*-194*c* may be generated during a prepare stage (e.g., offline, at a manufacturing time, before a runtime, etc.) and used during a runtime of the radar module 106. For example, the processor 102 may access the radar correction data 194*a*-194*c* to perform the radar coordinate transformation.

Figure 4:
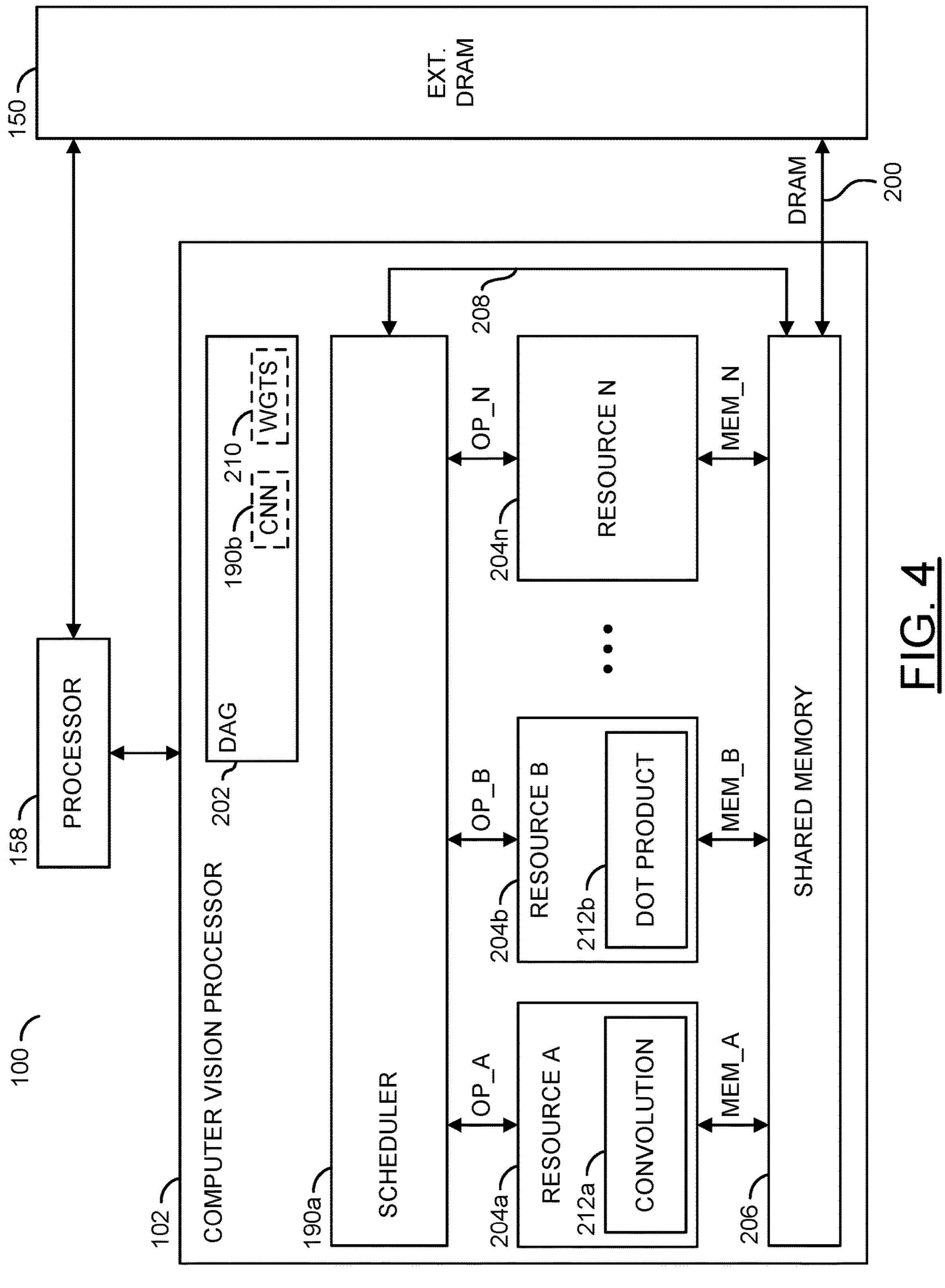
FIG. 4 is a diagram illustrating processing circuitry of a camera system implementing a convolutional neural network configured to perform object-based detection using neural network models.

Referring to FIG. 4, a diagram illustrating processing circuitry of a camera system implementing a convolutional neural network configured to perform object-based detection using neural network models is shown. In an example, processing circuitry of the apparatus 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the apparatus 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation, virtual aperture imaging, high resolution radar reconstruction, radar object detection and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In another example, the processor 102 may be an intelligent vision processor. In yet another example, the processor 102 may be a dataflow vector processor. In still another example, the processor 102 may be a radar signal processor. The memory 150 may implement an external memory (e.g., a memory external to the circuits 158 and 102). In an example, the circuit 150 may be implemented as a dynamic random access memory (DRAM) circuit. The processing circuitry of the apparatus 100 may comprise other components (not shown). The number, type and/or arrangement of the components of the processing circuitry of the apparatus 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190*a*, a block (or circuit) 202, one or more blocks (or circuits) 204*a*-204*n*, a block (or circuit) 206 and a path 208. The block 202 may implement a directed acyclic graph (DAG) memory. The DAG memory 202 may comprise the CNN module 190*b* and/or weight/bias values 210. The blocks 204*a*-204*n* may implement hardware resources (or engines). The block 206 may implement a shared memory circuit. In an example embodiment, one or more of the circuits 204*a*-204*n* may comprise blocks (or circuits) 212*a*-212*n*. In the example shown, the circuit 212*a* and the circuit 212*b* are implemented as representative examples in the respective hardware engines 204*a*-204*b*. One or more of the circuit 202, the circuits 204*a*-204*n* and/or the circuit 206 may be an example implementation of the hardware modules 190*a*-190*n* shown in association with FIG. 3.

In an example, the processor 158 may be configured to program the circuit 102 with one or more pre-trained artificial neural network models (ANNs) including the convolutional neural network (CNN) 190*b* having multiple output frames in accordance with embodiments of the invention and weights/kernels (WGTS) 210 utilized by the CNN module 190*b*. In various embodiments, the CNN module 190*b* may be configured (trained) for operation in an edge device. In an example, the processing circuitry of the apparatus 100 may be coupled to a sensor (e.g., video camera, etc.) configured to generate a data input. The processing circuitry of the apparatus 100 may be configured to generate one or more outputs in response to the data input from the sensor based on one or more inferences made by executing the pre-trained CNN module 190*b* with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision and/or radar signal processing. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190*b*, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors, radar signal processors and/or AI acceleration processors implemented by the processing circuitry of the apparatus 100 and configured to operate together.

In an example, the circuit 212*a* may implement convolution operations. In another example, the circuit 212*b* may be configured to provide dot product operations. The convolution and dot product operations may be used to perform computer (or machine) vision tasks (e.g., as part of an object detection process, etc.). In yet another example, one or more of the circuits 204*c*-204*n* may comprise blocks (or circuits) 212*c*-212*n* (not shown) to provide convolution calculations in multiple dimensions. In still another example, one or more of the circuits 204*a*-204*n* may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190*b* using the circuits 190*a*, 204*a*-204*n*, and 206.

Multiple signals (e.g., OP_A-OP_N) may be exchanged between the circuit 190*a* and the respective circuits 204*a*-204*n*. Each of the signals OP_A-OP_N may convey execution operation information and/or yield operation information. Multiple signals (e.g., MEM_A-MEM_N) may be exchanged between the respective circuits 204*a*-204*n* and the circuit 206. The signals MEM_A-MEM_N may carry data. A signal (e.g., DRAM) may be exchanged between the circuit 150 and the circuit 206. The signal DRAM may transfer data between the circuits 150 and 190*a* (e.g., on the transfer path 208).

The scheduler circuit 190*a* is generally operational to schedule tasks among the circuits 204*a*-204*n* to perform a variety of computer vision, radar signal processing and/or AI acceleration related tasks as defined by the processor 158.

Individual tasks may be allocated by the scheduler circuit 190*a* to the circuits 204*a*-204*n*. The scheduler circuit 190*a* may allocate the individual tasks in response to parsing the directed acyclic graphs (DAGs) provided by the processor 158. The scheduler circuit 190*a* may time multiplex the tasks to the circuits 204*a*-204*n* based on the availability of the circuits 204*a*-204*n* to perform the work.

Each circuit 204*a*-204*n* may implement a processing resource (or hardware engine). The hardware engines 204*a*-204*n* are generally operational to perform specific processing tasks. The hardware engines 204*a*-204*n* may be implemented to include dedicated hardware circuits that are optimized for high-performance and low power consumption while performing the specific processing tasks. In some configurations, the hardware engines 204*a*-204*n* may operate in parallel and independent of each other. In other configurations, the hardware engines 204*a*-204*n* may operate collectively among each other to perform allocated tasks.

The hardware engines 204*a*-204*n* may be homogenous processing resources (e.g., all circuits 204*a*-204*n* may have the same capabilities) or heterogeneous processing resources (e.g., two or more circuits 204*a*-204*n* may have different capabilities). The hardware engines 204*a*-204*n* are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204*a*-204*n* may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204*a*-204*n* implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204*a*-204*n* may be implemented solely as hardware circuits. In some embodiments, the hardware engines 204*a*-204*n* may be implemented as generic engines that may be configured through circuit customization and/or software/firmware to operate as special purpose machines (or engines). In some embodiments, the hardware engines 204*a*-204*n* may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204*a*-204*n* may be selected for a particular process and/or thread by the scheduler 190*a*. The scheduler 190*a* may be configured to assign the hardware engines 204*a*-204*n* to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190*a* and/or the hardware engines 204*a*-204*n*). In an example, the shared memory circuit 206 may implement an on-chip memory for the dataflow vector processor 102. The shared memory 206 is generally operational to store all of or portions of the multidimensional arrays (or vectors) of input data elements and output data elements generated and/or utilized by the hardware engines 204*a*-204*n*. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190*a* to the shared memory 206. The transfer path 208 may also be operational to move data from the shared memory 206 to the scheduler circuit 190*a*.

The processor 158 is shown communicating with the dataflow vector processor 102. The processor 158 may be configured as a controller for the dataflow vector processor 102. In some embodiments, the processor 158 may be configured to transfer instructions to the scheduler 190*a*. For example, the processor 158 may provide one or more directed acyclic graphs to the scheduler 190*a* via the DAG memory 202. The scheduler 190*a* may initialize and/or configure the hardware engines 204*a*-204*n* in response to parsing the directed acyclic graphs. In some embodiments, the processor 158 may receive status information from the scheduler 190*a*. For example, the scheduler 190*a* may provide a status information and/or readiness of outputs from the hardware engines 204*a*-204*n* to the processor 158 to enable the processor 158 to determine one or more next instructions to execute and/or decisions to make. In some embodiments, the processor 158 may be configured to communicate with the shared memory 206 (e.g., directly or through the scheduler 190*a*, which receives data from the shared memory 206 via the path 208). The processor 158 may be configured to retrieve information from the shared memory 206 to make decisions. The instructions performed by the processor 158 in response to information from the dataflow vector processor 102 may be varied according to the design criteria of a particular implementation.

Figure 5:
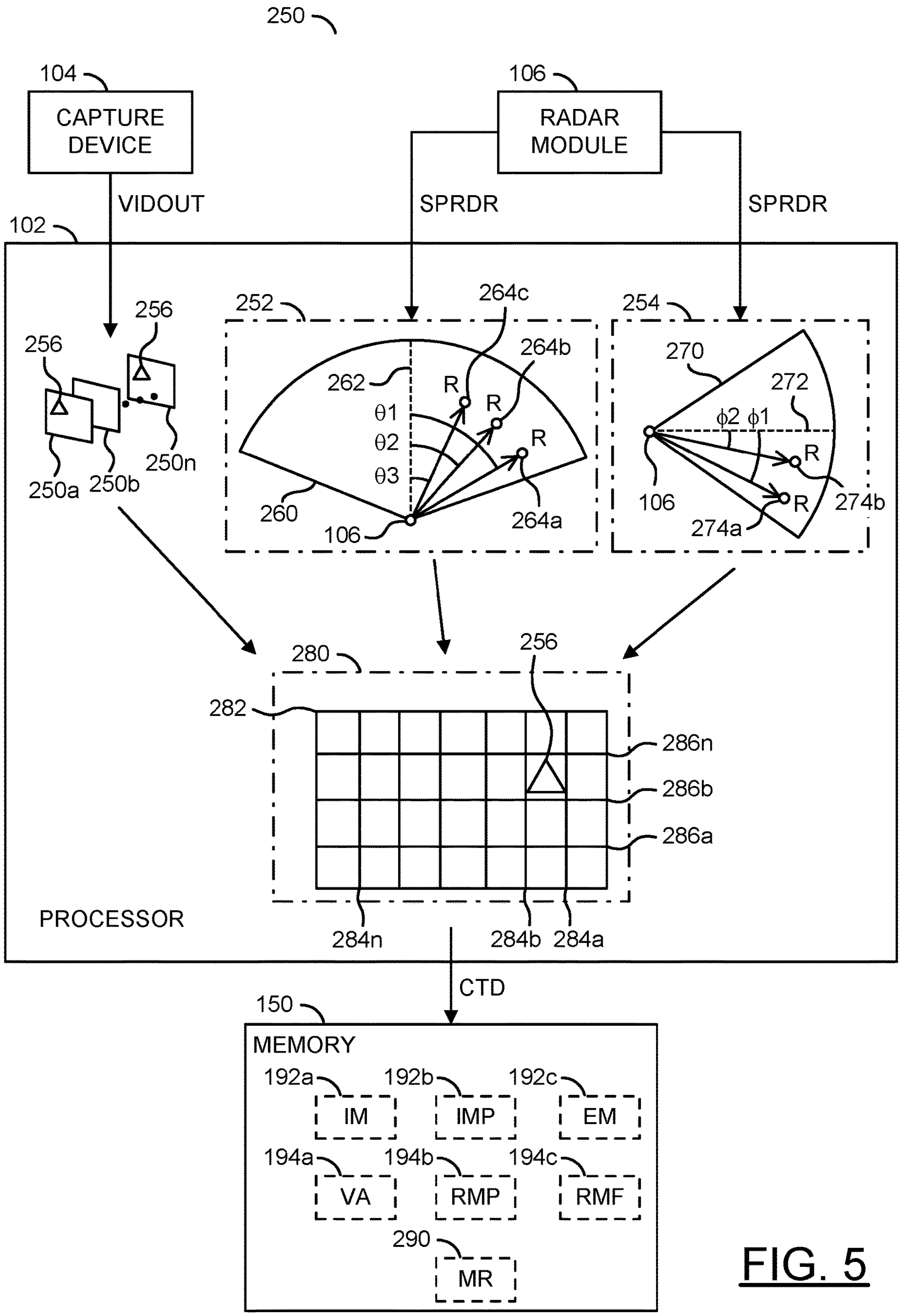
FIG. 5 is a diagram illustrating generating coordinate transformation data for an image sensor and a radar device.

Referring to FIG. 5, a diagram illustrating generating coordinate transformation data for an image sensor and a radar device is shown. An illustrative example of coordinate transformation data generation 250 is shown. The coordinate transformation data generation 250 may comprise the processor 102, the capture device 104, the radar module 106 and/or the memory 150. In some embodiments, the edge devices 100*a*-100*n* may be configured to receive the coordinate transformation data from an external source (e.g., a remote device, a cloud computing service, etc.). In some embodiments, the processor 102 may perform various calibration and/or correction operations for the capture device 104 and/or the radar module 106 to generate the coordinate transformation data. Details of performing the calibration and/or correction operations to generate the coordinate transformation data may be described in association with U.S. patent application Ser. No. 18/232,623, filed on Aug. 10, 2022, appropriate portions of which are incorporated by reference.

The processor 102 may receive the signal VIDOUT from the capture device 104 and/or the signal SPRDR from the radar module 106. The processor 102 may be configured to receive the signal VIDOUT and the signal SPRDR simultaneously (e.g., image data and radar data may be acquired at the same time to perform calibration and/or correction operations). In portions of the calibration and/or correction operations, the signal VIDOUT may be received without the signal SPRDR and/or the signal SPRDR may be received without the signal VIDOUT.

The processor 102 is shown performing operations on blocks 250*a*-250*n*, a block 252 and/or a block 254. The blocks 250*a*-250*n* may comprise images and/or video frames generated in response to the pixel data in the signal VIDOUT. For example, the processor 102 may perform the computer vision operations on the video frames 250*a*-250*n*. The blocks 252-254 may comprise radar data generated in response to the radar data in the signal SPRDR. For example, the blocks 252-254 may represent radar processing performed by the processor 102.

The video frames 250*a*-250*n* may each comprise a test object 256. In the example shown, the test object 256 may be a corner reflector. For various correction and/or calibration operations, the test object 256 may comprise a test board target (e.g., a test board comprising a grid array of dots, a test board comprising a checkerboard pattern, etc.). The test object 256 may be captured at different locations in each of the video frames 250*a*-250*n*. For example, during calibration and/or correction each of the edge devices 100*a*-100*n* may be moved to different locations to capture the test object 256 at multiple different distances and/or angles. In an example, for performing lens calibration to generate the intrinsic matrix 192*a*, the test object 256 may be a grid pattern test board. In another example, for image correction to generate the image mapping points 192*b*, the test object 256 may be a checkerboard pattern test board. In yet another example, for radar correction to generate the radar mapping points 194*b*, the test object 256 may be a corner reflector. The processor 102 may be configured to perform computer vision operations to detect a center point of the test object 256 and/or intersection points of the test object 256.

The radar data 252 is shown as a top down radar view. The top down radar view 252 may comprise the radar module 106 (e.g., representing a location of the receiver), a polar field of view (FoV) 260 and a polar centerline 262. Object detection locations 264*a*-264*c* are shown within the polar FoV 260, each at the same distance R from the radar module 106. The object location 264*a* may be at a polar angle Θ1 from the polar centerline 262, the object location 264*b* may be at a polar angle Θ2 from the polar centerline 262, and the object location 264*c* may be at a polar angle Θ3 from the polar centerline 262. Additional polar angles to object locations at the same distance R may be measured to enable additional partitioning. For example, polar angle values Θ1-Θn may be obtained from the radar module 106.

The radar data 254 is shown as a side radar view. The top down radar view 252 and the side radar view 254 may comprise different perspectives of the same radar data. The side radar view 254 may comprise the radar module 106 (e.g., representing a location of the receiver), the azimuth field of view (FoV) 270 and an azimuth centerline 272. Object locations 274*a*-274*b* are shown within the azimuth FoV 270, each at the same distance R from the radar module 106. The object location 274*a* may be at an azimuth angle φ1 from the azimuth centerline 272, and the object location 274*b* may be at an azimuth angle φ2 from the azimuth centerline 272. Additional azimuth angles to object locations at the same distance R may be measured to enable additional partitioning. For example, azimuth angle values φ1-φn may be obtained from the radar module 106.

A radar partitioned image 280 is shown. Image partitioning may be performed by the processor 102 to enable the images captured by the capture device 104 to be divided into several blocks by the polar radius Θ and the azimuth radius φ. Partitioning the image(s) may be used to map radar data to the image coordinates. In some embodiments, the radar module 106 may be configured to generate the radar data in a spherical coordinate system (e.g., comprising at least a distance value R, a polar radius value Θ and an azimuth radius value φ). The radar partitioned image 280 may be configured to enable the radar data in the spherical coordinate format to be mapped to the image coordinates of the images 250*a*-250*n*. In some embodiments, the radar module 106 may be configured to generate the radar data in a Cartesian coordinate system (e.g., comprising X,Y,Z coordinate values). If the Cartesian coordinate format is selected, the radar mapping points 194*b* may be generated to correlate the (X,Y,Z) coordinates of the radar data with the (U,V) coordinates of the image coordinate system. Similarly, if the spherical coordinate format is selected, the radar mapping points 194*b* may be generated to correlate the (R,Θ,φ) coordinates of the radar data with the (U,V) coordinates of the image coordinate system (e.g., since the optical center (e.g., the image sensor 180) and the center of the radar module 106 may not be at the same location, image partitioning alone may not be used directly).

The radar partitioned image 280 may comprise a radar projected image 282. The radar projected image 282 may comprise vertical lines 284*a*-284*n* and horizontal lines 286*a*-286*n*. The test object 256 is shown on the projected image 282.

The vertical lines 284*a*-284*n* may comprise projected polar angles. Each of the projected polar angles 284*a*-284*n* may correspond to a respective one of the polar angle values Θ1-Θn captured by the radar module 106 for the distance R. In the example shown, the projected polar angle 284*a* may correspond to the polar angle value Θ1, the projected polar angle 284*b* may correspond to the polar angle value Θ2, the projected polar value 284*n* may correspond to the polar angle value Θn, etc. The projected polar angles 284*a*-284*n* may comprise equally spaced vertical lines extending across the projected image 282. The processor 102 may be configured to project the polar angle values onto the 2D image. The number of polar angles Θ1-Θn captured may be determined based on the number (e.g., a resolution) of projected polar angle partitions desired on the projected image 282.

The horizontal lines 286*a*-286*n* may comprise projected azimuth angles. Each of the projected azimuth angles 286*a*-286*n* may correspond to a respective one of the azimuth angle values φ1-φn captured by the radar module 106 for the distance R. In the example shown, the projected azimuth angle 286*a* may correspond to the azimuth angle value φ1, the projected azimuth angle 286*b* may correspond to the azimuth angle value φ2, the projected azimuth value 286*n* may correspond to the azimuth angle value on, etc. The projected azimuth angles 286*a*-286*n* may comprise equally spaced horizontal lines extending across the projected image 282. The processor 102 may be configured to project the azimuth angle values onto the 2D image. The number of azimuth angles φ1-φn captured may be determined based on the number (e.g., a resolution) of projected azimuth angle partitions desired on the projected image 282.

The projected image 282 may comprise both the projected polar angles 284*a*-284*n* and the projected azimuth angles 286*a*-286*n*. The projected polar angles 284*a*-284*n* and the projected azimuth angles 286*a*-286*n* may provide a grid pattern on the radar projected image 282 to provide a number of block locations. In the example shown, the test object 256 may be located between the projected polar angles 284*a*-284*b* (e.g., between the polar angle Θ1 and the polar angle Θ2) and the projected azimuth angles 286*b*-286*n* (e.g., between the azimuth angle φ2 and the azimuth angle φn). The processor 102 may use the projected polar angles 284*a*-284*n* and/or the projected azimuth angles 286*a*-286*n* to compare a region of interest of the object 256 detected in the projected image 282 using computer vision operations and the region of interest of the object detected from the radar data to map radar data to the image coordinates (e.g., generate the radar mapping points 194*b*, which may be used to determine the radar mapping function 194*c*).

The processor 102 is shown presenting a signal (e.g., CTD) to the memory 150. The signal CTD may comprise the coordinate transfer data. The coordinate transfer data may comprise the intrinsic matrix 192*a*, the image mapping points 192*b* and/or the extrinsic matrix 192*c*. For example, based on the lens correction operations, the processor 102 may generate the intrinsic matrix 192*a* and based on the image calibration operations, the processor 102 may generate the image mapping points 192*b*. The processor 102 may use the intrinsic matrix 192*a* and the image mapping points 192*b* to generate the extrinsic matrix 192*c*. The coordinate transfer data may comprise the valid area 194*a*, the radar mapping points 194*b* and/or the radar mapping function 194*c*. For example, based on the format selected (e.g., spherical coordinates) and/or the valid area 194*a*, the processor 102 may use the projected polar angles 284*a*-284*n* and the projected azimuth angles 286*a*-286*n* to correlate radar data with center point data from image coordinates to bind the radar mapping points 194*b*. In another example, based on the format selected (e.g., Cartesian coordinates) and/or the valid area 194*a*, the processor 102 may correlate radar data with center point data from image coordinates to bind the radar mapping points 194*b*. The processor 102 may use the valid area 194*a* and the radar mapping points 194*b* to generate the radar mapping function 194*c*.

The memory 150 may further comprise a block (or circuit) 290. The block 290 may comprise matching rules. The matching rules 290 may be used in the aligned coordinate system. The matching rules 290 may be used to determine whether to perform the additional processing. For example, objects detected that do not satisfy the matching rules 290 may be ignored. The matching rules 290 may be used to determine whether an event of interest has been detected. Generally, the matching rules 290 may comprise threshold values for an amount of overlap between computer vision results and the radar detection results. In some embodiments, the matching rules 290 may comprise threshold values (e.g., minimum and/or maximum values) for a distance of the object from the capture device 104 and/or the radar module 106. For example, additional processing may not be performed even if there is a complete overlap between computer vision and radar results unless the aligned results are also within the distance values of the matching rules 290. In some embodiments, the matching rules 290 may comprise threshold values for a region of the environment (e.g., X,Y,Z coordinates). For example, additional processing may not be performed even if there is a complete overlap between the computer vision and radar results unless the aligned results are also within a particular (e.g., defined) region of the environment (e.g., near a center of the environment, above/below a particular height, towards a left/right edge of a field of view, etc.). The region and/or distance may be user selected values. The particular threshold values of the matching rules 290 may be varied according to the design criteria of a particular implementation.

Figure 6:
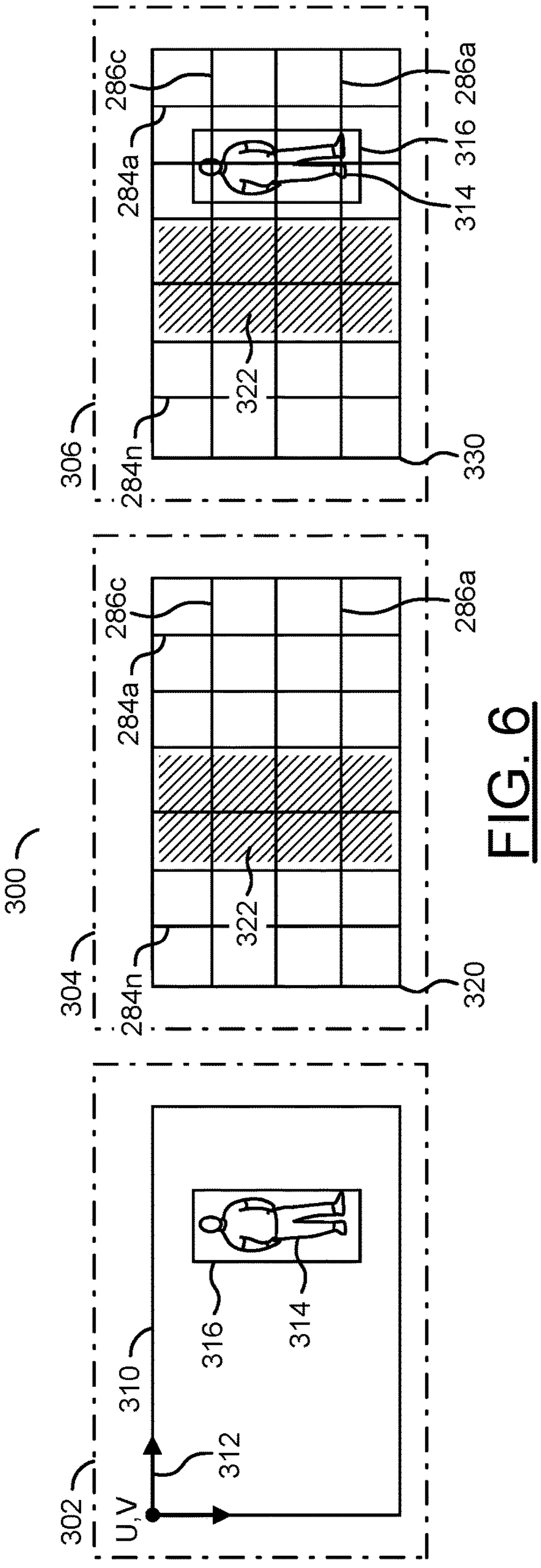
FIG. 6 is a diagram illustrating an intersection comparison on an aligned coordinate system with a no match result.

Referring to FIG. 6, a diagram illustrating an intersection comparison on an aligned coordinate system with a no match result is shown. An illustrative example of sensor fusion data 300 is shown. The sensor fusion data 300 may comprise an image 302, radar data 304 and/or aligned data 306.

The processor 102 may be configured to create a mapping method to generate the aligned data 306. The mapping method may use the coordinate transformation data to provide the aligned data 306. In one example, the coordinate transformation data may comprise the radar mapping function 194*c* to convert the radar coordinates to the image coordinates. In another example, coordinate transformation data may comprise the extrinsic matrix 192*c* that may provide the coordinate transformation data to convert the image coordinates to the real world coordinates.

The image 302 may comprise a computer vision result 310. The computer vision result 310 may be generated by the processor 102 in response to performing computer vision operations on video frames to detect and/or locate objects. An axis 312 is shown on the computer vision result 310. The axis 312 may represent an image coordinate system 312. The image coordinate system 312 may have an origin point of (U,V) at a top left corner of the computer vision result 310. The origin point of the image coordinate system 312 may be varied according to the design criteria of a particular implementation (e.g., top left, top right, bottom left, bottom right, center, etc.).

A detected object 314 is shown on the computer vision result. In the example shown, the detected object 314 may be a person. The detected object 314 may be determined based on characteristics of the object detected in the image 302. In an example, the processor 102 may use a feature set comprising characteristics of an object to compare with the pixel data of the image 302. In some embodiments, the detected object 314 may be a person, an animal, a vehicle, etc. The type of detected object 314 defined by the feature set may be varied according to the design criteria of a particular implementation.

A bounding box 316 is shown around the detected object 314. The bounding box 316 may represent a location of the detected object 314 (e.g., a computer vision detection window). The computer vision detection window 316 may define a range of pixel locations where the detected object 314 is located in the image coordinate system 312. In an example, the computer vision detection window 316 may be defined by one or more corner point locations in the image coordinate system 312. For example, the computer vision detection window 316 may comprise a top left location of the detected object 314 (e.g., U1,V1) and a bottom right location of the detected object 314 (e.g., U2,V2) that define the rectangular shape of the computer vision detection window 316. In another example, the computer vision detection window 316 may comprise a top left location of the detected object 314 (e.g., U1,V1) and a height and width value in pixels to define the size of the computer vision detection window 316. The computer vision detection window 316 may be used by the processor 102 as a detection location of the object in the video frames in the image coordinate system 312.

The radar data 304 may comprise a projected image 320. The projected image 320 may comprise the projected polar angles 284*a*-284*n* and the projected azimuth angles 286*a*-286*n*. A shaded region 322 is shown. The shaded region 322 may represent a location of the object detected in the radar data in the projected image 320 (e.g., a radar detection location). The radar detection location 322 may represent the location of the detected object in the radar coordinate system determined by the radar data generated by the processor 102 in response to the radar data 304. In the example shown, the radar detection location 322 may be within the polar angle values Θ3-Θ5 and within the azimuth angle values φ1-φn. In the example shown, the radar detection location 322 may have a rectangular shape. In some embodiments, the radar detection location 322 may have an irregular shape that corresponds to the shape of the object detected. The radar detection location 322 may be used as a detection location of the object in the radar data. The size and/or shape of the radar detection location 322 may be varied according to the design criteria of a particular implementation.

The aligned data 306 may comprise fused data 330 on the aligned coordinate system. In an example, the processor 102 may perform the coordinate transformation of the radar detection location 322 to transfer the radar data to the image coordinate system 312. The detected object 314, the computer vision detection window 316 and the radar detection location 322 are shown on the fused data 330.

In the example shown, the radar detection location 322 may be within the polar angle values Θ3-Θ5 and within the azimuth angle values φ1-φn, while the location of the computer vision detection window 316 may be within the polar angle values Θ1-Θ3 and within the azimuth angle values φ1-φn. In the example shown, there may not be any overlap between the computer vision detection window 316 and the radar detection location 322. For example, there may not be an intersection between the computer vision detection window 316 representing the computer vision detection location and the radar detection location 322. In one example, there may not be an intersection because of an error in performing the detection of the object (e.g., either using the computer vision and/or the analysis of the radar data). In another example, there may not be an intersection because the computer vision result 314 may not be a live person (e.g., a 2D printout, a 2D representation on a display monitor, etc.). In yet another example, there may not be an intersection because the computer vision result 314 may not be moving (e.g., a person standing still may not be part of the matching rules 290). Since there is no intersection on the aligned coordinate system, the detection result may be ignored (e.g., no additional processing of information may be performed, the result may be discarded, etc.).

The processor 102 may map the radar coordinates to the image coordinate system 312 (e.g., U,V coordinates). In the same coordinate system, the matching rules 290 may be implemented. The processor 102 may rebuild the world coordinates to provide the aligned coordinate system (e.g., use the U,V result from the capture device 104 and the radar depth data Z from the radar data). The processor 102 may transfer the U,V,Z coordinates to the X,Y,Z coordinates of the real-world.

Figure 7:
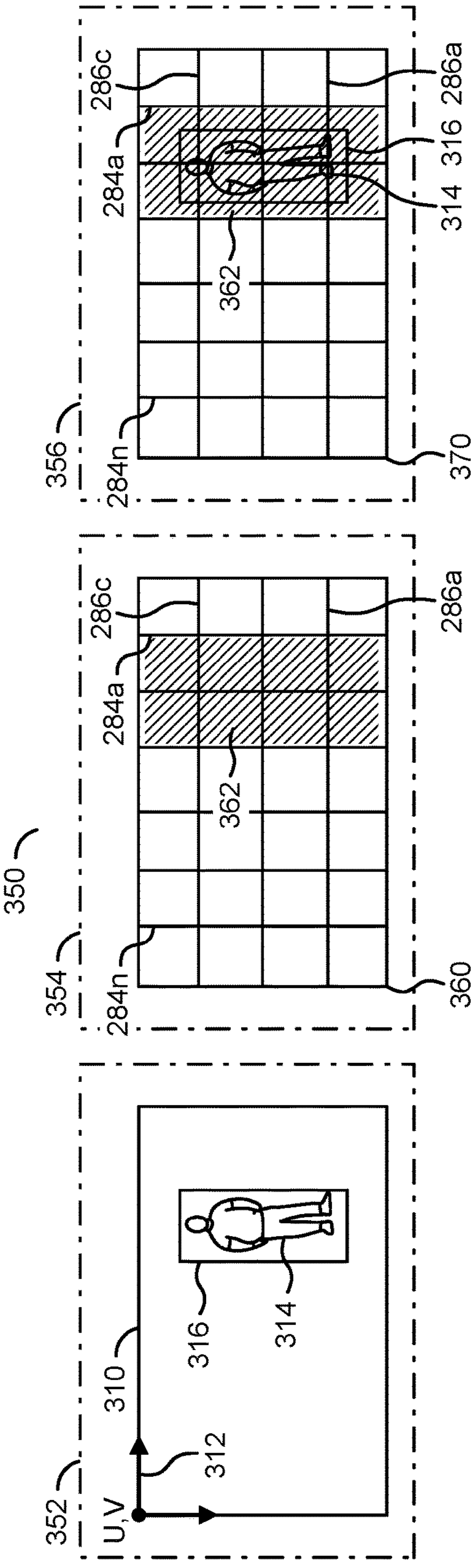
FIG. 7 is a diagram illustrating an intersection comparison on an aligned coordinate system with a match result.

Referring to FIG. 7, a diagram illustrating an intersection comparison on an aligned coordinate system with a match result is shown. An illustrative example of sensor fusion data 350 is shown with a match result. The sensor fusion data 350 may comprise an image 352, radar data 354 and/or aligned data 356. The image 352, the radar data 354 and the aligned data 356 may be similar to the image 302, the radar data 304 and the aligned data 306 shown in association with FIG. 6, but with different results.

The image 352 may comprise the computer vision result 310. The computer vision result 310 may comprise the image coordinate system 312, the detected object 314 and the computer vision detection window 316. The computer vision detection window 316 is shown at the same location as in the computer vision result 310 shown in association with FIG. 6.

The radar data 354 may comprise a projected image 360. The projected image 360 may comprise the projected polar angles 284*a*-284*n* and the projected azimuth angles 286*a*-286*n*. A shaded region 362 is shown on the projected image 360. The shaded region 362 may be a radar detection location similar to the radar detection location 322 described in association with FIG. 6. The radar detection location 362 may represent the location in the radar coordinate system of the detected object determined by the radar data generated by the processor 102 in response to the radar data 354. In the example shown, the radar detection location 362 may be within the polar angle values Θ1-Θ3 and within the azimuth angle values φ1-φn. The radar detection location 362 is at a different location than the radar detection location 322 shown in association with FIG. 6.

The aligned data 356 may comprise fused data 370 on the aligned coordinate system. In an example, the processor 102 may perform the coordinate transformation of the detection location 362 to transfer the radar data to the image coordinate system 312. The detected object 314, the computer vision detection window 316 and the radar detection location 362 are shown on the fused data 370.

In the example shown, the radar detection location 362 may be within the polar angle values Θ1-Θ3 and within the azimuth angle values φ1-φn, while the location of the computer vision detection window 316 may be within the polar angle values Θ1-Θ3 and within the azimuth angle values φ1-φn. In the example shown, there may be a complete overlap between the computer vision detection window 316 and the radar detection location 362 in the aligned coordinate system. For example, there may be an intersection between the computer vision detection window 316 representing the computer vision detection location and the radar detection location 362. In one example, there may be an intersection because the computer vision result and the radar detection result may be detecting the same object. Since there is an intersection on the aligned coordinate system, the detection result may be used for further processing (e.g., additional processing of information may be performed).

The matching rules 290 may be implemented after the sensor data is available in the same coordinate system. In one example, the matching rules 290 may comprise an amount of intersection between the computer vision detection window and the radar detection window (e.g., a percentage threshold of overlap and/or intersection). In another example, the matching rules 290 may comprise detecting an object with depth (e.g., distinguishing between a 3D object and a 2D representation of the object). In yet another example, the matching rules 290 may comprise detecting a movement of an object (e.g., distinguishing between a moving object and a stationary object). The matching rules 290 may be varied according to the design criteria of a particular implementation.

In the example shown, the intersection between the computer vision detection window 316 and the radar detection location 322 may have a complete overlap (e.g., 100% intersection). In some embodiments, a partial overlap may be considered an intersection according to the matching rules 290. In one example, the computer vision detection window 316 may overlap 73% with the radar detection location 322. If the threshold of overlap in the matching rules 290 is less than or equal to 73% (e.g., a 66% overlap threshold), then the matching rules 290 may determine that the detections are an intersection. If the threshold of overlap in the matching rules 290 is greater than 73% (e.g., a 75% overlap threshold), then the matching rules 290 may determine that the detections are not an intersection.

Figure 8:
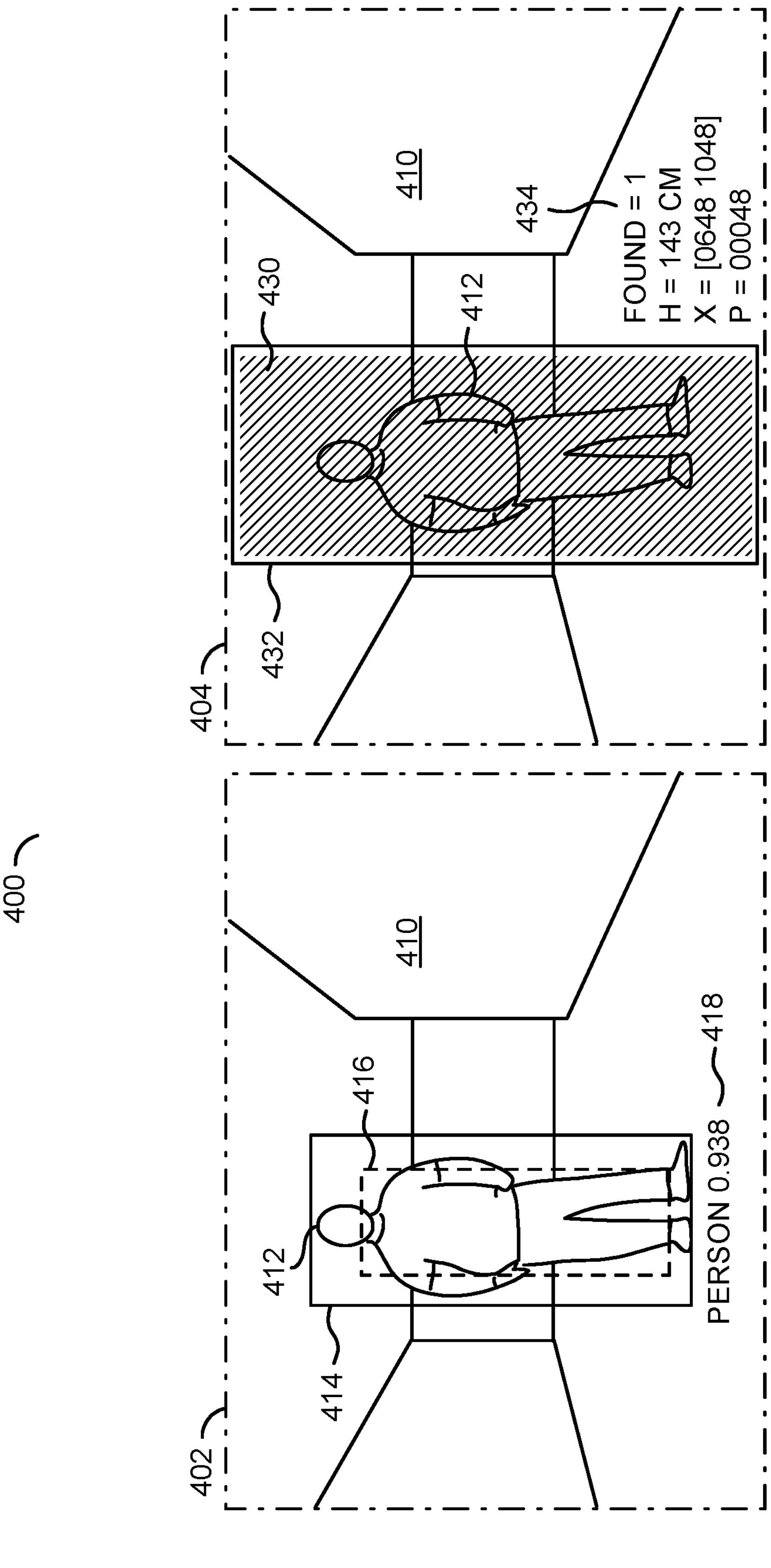
FIG. 8 is a diagram illustrating a computer vision detection window and a radar detection window.

Referring to FIG. 8, a diagram illustrating a computer vision detection window and a radar detection window is shown. An intersection match 400 is shown. The intersection match 400 may comprise a video frame 402 and radar data 404.

The video frame 402 may be one example of video frames processed by the processor 102. The video frame 402 may be an illustrative example of one video frame of a sequence of the video frames analyzed/evaluated by the CNN module 190*b*. The example video frame 402 may comprise pixel data arranged as a video frame provided to the CNN module 190*b*. The CNN module 190*b* may be configured to analyze the pixel data of the video frame 402 to detect objects of interest, object regions of interest and/or determine characteristics of the objects of interest detected (e.g., a size, a location, a distance, a classification, a color temperature, etc. of various types of objects/subjects) in the video frame 402. In an example, a computer vision neural network model implemented by CNN module 190*b* may be configured to detect various objects in the example video frame 402. The example video frame 402 may comprise a RGB image. In some embodiments, a similar analysis may be performed on the video frame 402 that may comprise an RGB-IR image, a RCCB image, a thermal image, etc.

The example video frame 402 may be a video frame captured of an indoor area 410 (e.g., a view from one of the edge devices 100*a*-100*n* implementing the capture device 104). In one example, the example video frame 402 may be a video frame captured outdoors by a smartphone camera. In another example, the example video frame 402 may be a video captured by a home security camera. While the indoor area 410 is shown as a representative example, the computer vision operations may be performed for an outdoor area. The use-case for capturing and analyzing the example video frame 402 may be varied according to the design criteria of a particular implementation.

The CNN module 190*b* may be configured to perform the computer vision operations. An object 412 is shown in the indoor area 410. In the example shown, the object 412 may be a person. Shapes 414-416 are shown around the object 412.

A shape 414 is shown. The shape 414 may represent the detection of an object/subject by the computer vision operations performed by the processor 102. The shape 414 may comprise the pixel data corresponding to an object detected by the computer vision operations pipeline and/or the neural network model implemented by the CNN module 190*b*. In the example shown, the shape 414 may be detected in response to person detection, facial recognition, animal detection, obstacle detection and/or pedestrian detection operations performed by the CNN module 190*b* (e.g., the computer vision neural network model may be libraries configured to detect people, vehicles, roadways, sky regions, animals, clouds, and/or traffic signals). The shape 414 is shown for illustrative purposes. In an example, the shape 414 may be visual representations of the object detection (e.g., the shape 414 may not appear on an output video frame). In another example, the shape 414 may be a bounding box generated by the processor 102 displayed on the output video frames to indicate that an object has been detected (e.g., the bounding boxes 330-344 may be displayed in a debug mode of operation).

The computer vision operations may be configured to detect characteristics of the detected objects, behavior of the objects detected, a movement direction of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 402 is shown, the behavior, movement direction and/or liveness of an object may be determined by analyzing a sequence of the video frames (e.g., the video frames 250*a*-250*n*) captured over time. For example, a path of movement and/or speed of movement characteristic may be used to determine that an object classified as a person may be walking or running. The types of characteristics and/or behaviors detected may be varied according to the design criteria of a particular implementation.

The computer vision detection window 414 may represent a location of the object 412 in the image coordinate system 312. In the example shown, the computer vision detection window 414 may be the region of interest of the person 412. In an example, the settings (e.g., the feature set) for the processor 102 (e.g., the computer vision AI neural network model implemented by the CNN module 190*b*) may define objects of interest to be people. For example, decorations, furniture, vehicles and/or buildings may not be objects of interest for a feature set defined to detect people. In the example shown, the computer vision detection window 414 is shown having a square (or rectangular) shape. In some embodiments, the shape of the computer vision detection window 414 that corresponds to the objects of interest detected may be formed to follow the shape of the body of the people detected and/or the shape of the other objects detected (e.g., an irregular shape that follows the curves and/or the body shape of the detected objects).

The processor 102 and/or the CNN module 190*b* may be configured to implement region, pedestrian and/or face detection techniques. In some embodiments, the processor 102 and/or the CNN module 190*b* may detect other types of subjects as objects of interest (e.g., animals, vehicles, moving objects, falling objects, etc.). The computer vision techniques may be configured to detect the regions of interest (ROIs) of the detected object 412 and/or generate the information about the detected object 412. For example, the bounding box 414 may be a visual representation of the ROIs detected. The processor 102 may loop the computer vision technique (e.g., iteratively perform object/subject detection throughout the example video frame 402) in order to determine if any objects of interest (e.g., as defined by the feature set) are within the field of view of the lens 160 and/or the image sensor 180.

While only the object 412 is shown as an object of interest, the computer vision operations performed by the processor 102 and/or the CNN module 190*b* may be configured to detect background objects and/or other types of objects, even if not used for sensor fusion. The background objects may be detected for other computer vision purposes (e.g., training data, labeling, depth detection, etc.), but may not be used for the purposes of the intersection determination with the radar data performed by the apparatus 100. The type(s) of subjects identified as the object of interest 414 may be varied according to the design criteria of a particular implementation.

A dotted shape 416 is shown. The dotted shape 416 may represent a bad detection condition. In the example shown, the bad detection condition 416 may not provide a bounding box that surrounds the full detected object 412. For example, the bad detection condition 416 may not reach a full height of the detected object 412. Similarly, the bad detection condition 416 may not cover the full width of the detected object 412. By comparison, the computer vision detection window 414 may provide a good detection condition window. The detected object 412 may be fully within the computer vision detection window 414. For example, the good detection condition of the computer vision detection window 414 may reach a full height of the detected object 412. Similarly, the good detection condition of the computer vision detection window 414 may cover the full width of the detected object 412. In one example, a computer vision result that provides the bad detection condition 416, may not be capable of providing a height measurement for the detected object 412 (e.g., to be described in association with FIG. 9). The good detection condition of the computer vision detection window 414 may be capable of providing a height measurement for the detected object 412. For example, the matching rules 290 may reject a computer vision result that provides the bad detection condition 416.

The computer vision detection window 414 may also be a classification window. The computer vision detection window 414 may illustrate the classification performed on the detected object 412. A classification result 418 may be associated with the classification window 414. The classification result 418 may display the type of object detected and/or a confidence value of the classification. In the example shown, the classification result 418 may indicate that the computer vision analysis determined that the detected object 412 may be classified as a person with a confidence value of 0.938.

The radar data 404 may comprise results of the radar processing performed by the processor 102 of the indoor area 410. While the edge device 100*i* may be located in the same spot when capturing the video frame 402 and the radar data 404 the capture device 104 and the radar module 106 may not be in the exact same position. The detected person 412 is shown in the indoor area 410. A shaded area 430 is shown. The shaded area 430 may be the radar detection location for the radar data 404. The radar detection location 430 may correspond to the location of the detected person 412. Generally, radar detection location 430 may not indicate the type of object detected.

A box 432 is shown around the radar detection location. The box 432 may comprise the radar detection data. The radar detection data 432 may illustrate the radar data generated by the processor 102 after analyzing the radar data 404. Radar results 434 may be associated with the radar detection data 432. The radar results 434 may display the raw radar results associated with the radar detection. In the example shown, the radar results 434 may indicate that the radar analysis performed by the processor 102 determined that the detected object 412 may correspond to a detection (e.g., FOUND=1), have a height of 143 cm, have a X dimension width from to and a power value of 00048. Depending on the radar module 106 implemented, the radar results 434 may not necessarily comprise all of the radar results 434 shown (e.g., not all radar modules provide the power value that indicates a strength of the reflector). The radar detection data 432 may be used to define the radar detection location 430.

The processor 102 may be configured to apply the coordinate transformation data to the computer vision detection window 414 and/or the radar detection location 430 to compare the location of the computer vision results to the location of the radar detection results on an aligned coordinate system. For example, the radar mapping function 194*c* may be applied to the radar detection location 430 to transform the location to the image coordinate system 312. In the example shown, the location of the computer vision detection window 414 and the radar detection location 430 may be a match (e.g., there may be an intersection between the location of the computer vision results and the radar detection results on the aligned coordinate system). For example, the detected object 412 may be an event of interest. Based on the intersection, the processor 102 may use the location of the computer vision detection window 414 and/or the radar detection location 430 for additional processing.

In some embodiments, the processor 102 may limit additional processing of the video frame 402 to the region of interest (e.g., the overlap between the computer vision detection window 414 and the radar detection location 430). Limiting additional processing of the video frame 402 to the region of interest may result in less processing time and/or resources used for the video frame 402. For example, instead of wasting processing time and/or resources (e.g., additional processing of the background may not be beneficial), the processing time and/or resources may be used on the region of interest to still provide a desired image quality output for the events of interest.

In one example, the additional processing may comprise adjusting a white balance and/or auto-exposure. In another example, bitrate control may be the additional processing performed in response to the detection of the intersection. In yet another example, artificial intelligence image processing enhancements (e.g., using a neural network for image signal processing) and/or other video/image quality control features may be performed in response to the detection of the intersection. The various types of additional processing performed using the aligned ROI may be varied according to the design criteria of a particular implementation.

Figure 9:
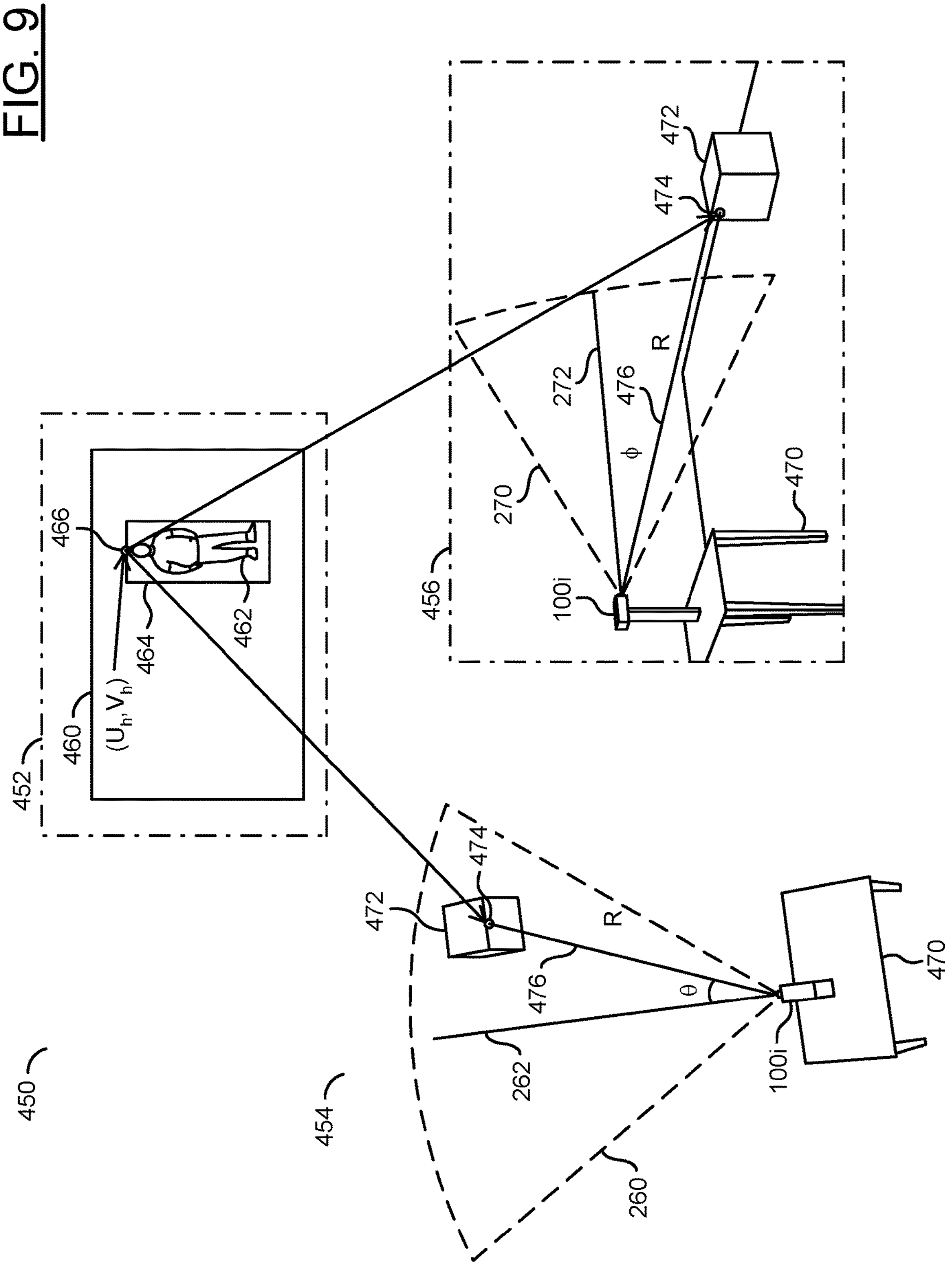
FIG. 9 is a diagram illustrating detecting a height of an object using a single lens camera and radar data.

Referring to FIG. 9, a diagram illustrating detecting a height of an object using a single lens camera and radar data is shown. A height determination 450 is shown. The height determination 450 may comprise an image 452, a top down view 454 and a side view 456.

The image 452 may comprise computer vision results 460. The computer vision results 460 may comprise a detected object 462, a computer vision detection window 464 and a highest point position 466. In the example shown, the detected object 462 may be a person. The computer vision detection window 464 is shown as a bounding box around the detected object 462. The highest point position 466 is shown at a top of the computer vision detection window 464. In the example shown, the computer vision detection window 464 may be a rectangular shape. With a rectangular shaped computer vision detection window 464, the highest point position 466 may be a center pixel location of the top row of the computer vision detection window 464 (e.g., each pixel of the top row may have the same V coordinate). In an example where the computer vision detection window 464 has an irregular shape, the highest point position 466 may be the pixel location at the top and/or peak of the bounding shape. In the example shown, the highest point position 466 may have image coordinates of (Uh,Vh) in the image coordinate system 312.

The top down view 454 may comprise the polar angle FoV 260 of the radar module 106 and the polar centerline 262. The side view 456 may comprise the azimuth angle FoV 270 of the radar module 106 and the azimuth centerline 272. The top down view 454 and the side view 456 may each comprise the edge device 100*i* standing on a table 470. The radar module 106 of the edge device 100*i* may capture radar data of an object 472. The object 472 is shown as a box that may correspond to the location of the person 462. A location point 474 is shown on the object 472. The location point (e.g., x,y,z) may provide a real-world coordinate of a highest radar point of the object 472. The real-world coordinate location of the edge device 100*i* may be at an origin point (x0,y0,z0).

The processor 102 may be configured to select a data format for the radar data captured by the radar module 106. In some embodiments, the radar data may be captured in a format that provides coordinates in a spherical format comprising a range (R), a polar angle (Θ) and an azimuth angle (φ). In some embodiments, the radar data may be captured in a format that provides coordinates in a Cartesian format providing X, Y, and Z environment coordinates. The radar data may further comprise a velocity, a Signal to Noise Ratio (SNR) value and/or strength value (e.g., object reflection strength). The invalid data may be filtered using one or more of the SNR value, the strength value, filtering a static point (e.g., velocity at zero) and/or filtering out a range of data (e.g., a range larger than the field of view of the radar lens). After filtering is performed, the selected data format may be used for further correction and/or calibration of the radar module 106. In the example shown, the data format selected may be the spherical format.

In the top down view 454, an object line 476 is shown from the edge device 100*i* to the highest radar point 474 of the object 472. A polar angle value @ is shown between the polar centerline 262 and the object line 476. A range value R is shown as a distance from the radar module 106 to the highest radar point 474.

In the side view 456, the object line 476 is shown from the edge device 100*i* to the highest radar point 474 of the object 472. An azimuth angle value φ is shown between the azimuth centerline 272 and the object line 476. A range value R is shown as a distance from the radar module 106 to the highest radar point 474.

The processor 102 may be configured to determine the highest point position 466 (e.g., Uh, Vh) in the computer vision detection window 464. The processor 102 may use the highest point position 466 as the height of the detected object 462. The processor 102 may determine the real-world coordinate value (e.g., X,Y,Z) of the highest point position 466 by imputing the highest point position 466 and the depth data Z determined from the radar data. For example, the depth data Z may be determined based on the spherical radar data (e.g., R,Θ,φ). For example, the coordinate transformation data may enable the depth data Z to be determined, and the extrinsic matrix 192*c* may be used to calculate the height of the detected object 462.

Generally, the highest point position 466 may be used as the object height. For example, if the detected object 462 is a person, whether the person 462 is sitting or standing may not matter for the application of the additional processing. The focus may be on the height of the person 462 in the real world perpendicular to the ground. The highest point position 466 may be used by the processor 102 to provide the height of the detected object 462 perpendicular to the ground at a particular moment in time.

In embodiments of the edge devices 100*a*-100*n* that perform applications that do not involve a height determination, then the calibration of the edge devices 100*a*-100*n* may be performed without determining the extrinsic matrix 192*c*. For example, if the height value is not determined, then there may not be a benefit to implementing a coordinate transformation from the image coordinates to the real world coordinates (and there may not be a benefit from determining the extrinsic matrix 192*c*). If no height value is determined, then the edge devices 100*a*-100*n* may use the radar mapping function 194*c* to map the radar detection result to the image coordinates.

Figure 10:
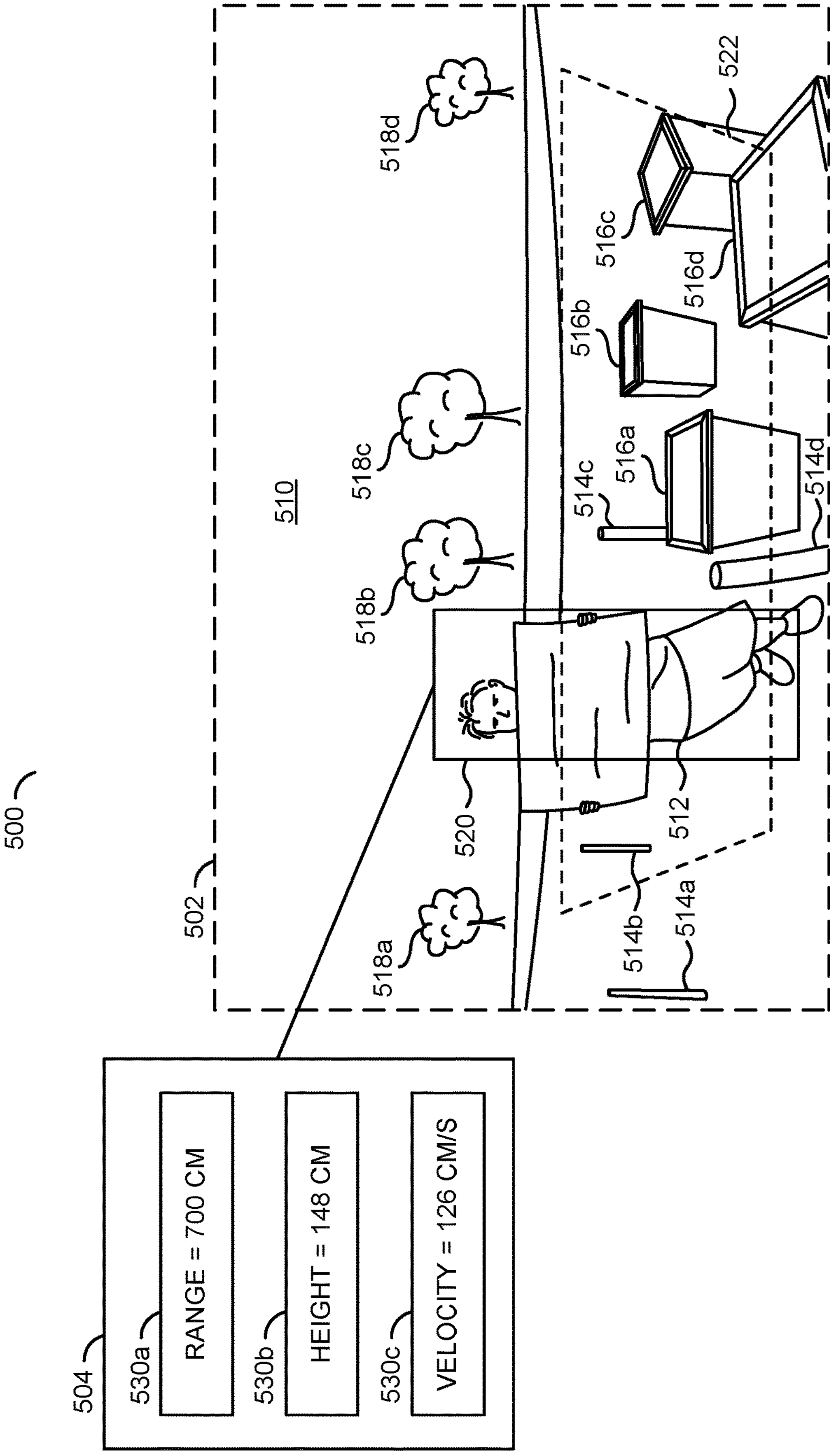
FIG. 10 is a diagram illustrating a detection of range information, height information and velocity information about an object.

Referring to FIG. 10, a diagram illustrating a detection of range information, height information and velocity information about an object is shown. An example data generation 500 is shown. The example data generation 500 may comprise an example video frame 502 and an information block 504. The example video frame 502 may be an example video frame generated in response to the pixel data captured by the capture device 104. The information block 504 may comprise the additional data generated for the event of interest by the processor 102 in response to detecting an intersection between the computer vision detection result and the radar data result according to the matching rules 290.

The video frame 502 may comprise a view of an outdoor area 510. The processor 102 and/or the CNN module 190*b* may use a feature set configured to detect objects of interest for the outdoor area 510. The example video frame 502 may comprise various objects and/or object regions. Not all of the objects in the example video frame 502 may be determined to be an object of interest by the neural network model implemented by the CNN module 190*b*. The example video frame 502 may comprise a person 512, a number of posts 514*a*-514*d*, a number of bins 516*a*-516*d* and/or a number of trees 518*a*-518*d*. Some objects may not be relevant to a particular application (e.g., may not be objects of interest). In one example, for a vehicle application, objects such as the posts 514*a*-514*d* and/or the trees 518*a*-518*d* may be objects of interest. In another example, objects such as the posts 514*a*-514*d* and/or the trees 518*a*-518*d* may not be objects of interest that the computer vision operations may detect for the purposes of determining auto white balance and/or autoexposure. In the example shown, for detecting liveness and/or additional information about people in the environment, the person 512 may be the object of interest. Which object(s) are determined to be the objects of interest may be varied according to the design criteria of a particular implementation.

A bounding box 520 is shown. The bounding box 520 may comprise the aligned ROI (e.g., the overlap of the computer vision detection window and the radar data). For example, the person 512 may be detected by the computer vision operations performed by the processor 102 based on the characteristics of the person 512 and the radar data may detect the movement of the person 512 at the same location.

The aligned ROI 520 may be located around the person 512. The aligned ROI 520 may represent that there may be an intersection between the computer vision detection location and the radar detection location in the image coordinate system 312. In some embodiments, the matching rules 290 may enable the intersection to be detected at the aligned ROI 520 based on the intersection between the computer vision detection location and the radar detection location alone (e.g., the aligned ROI 520 may be the event of interest). In some embodiments, the matching rules 290 may comprise conditions in addition to the overlap between the computer vision detection location and the radar detection location.

A dotted region 522 is shown. The dotted region 522 may be located around the person 512 and the bins 516*a*-516*d*. The dotted region 522 may comprise a user selected region. In the example shown, the user selected region 522 may be selected around multiple objects in the foreground of the outdoor area 510. For example, a user may provide an input (e.g., the signal USER shown in association with FIG. 3) that defines the user selected region 522. When applied to the video frame 502, the user selected region 522 may correspond to a location around the person 512 and the bins 516*a*-516*d*. In some embodiments, the radar data alone may not be capable of distinguishing between the person 512 and the bins 516*a*-516*d* (e.g., the radar data may detect motion, and the person 512 may not be moving). The radar data may be capable of distinguishing between the person 512, the bins 516*a*-516*d* and the poles 514*a*-514*d* (e.g., based on movement). For example, the poles 514*a*-514*d* may be too thin to be a person and/or stationary.

The user selected region 522 may be configured to provide a limitation for the matching rules 290. The user selected region 522 may be one criteria for the matching rules 290. For example, even if the aligned ROI 520 provides the overlap between the computer vision detection window and the radar detection window, if the aligned ROI 520 is not within the user selected region 522, then the processor 102 may not detect a match (e.g., determine the event of interest) according to the matching rules 290. In some embodiments, the matching rules 290 may indicate that the aligned ROI 520 may be entirely within the user selected region 522 to determine a match. In some embodiments, the matching rules 290 may indicate that the aligned ROI 520 may be partially within the user selected region 522 to determine a match. For example, the additional processing may be performed on the aligned ROI 520 if the aligned ROI 520 is within the user selected region 522 (or partially within the user selected region 522) a sufficient amount in order to meet the matching rules 290. The amount that the aligned ROI 520 may overlap with the user selected region 522 may be varied according to the design criteria of a particular implementation.

In some embodiments, the matching rules 290 may enable a match based on a computer vision detection window and the user selected region 522 alone (e.g., without an overlap with the radar detection window). In some embodiments, the matching rules 290 may enable a match based on a radar detection window and the user selected region 522 alone (e.g., without an overlap with the computer vision detection window). In some embodiments, the matching rules 290 may enable a match based on a full overlap with the computer vision detection window and the user selected region 522 but only a partial overlap with the radar detection window. In some embodiments, the matching rules 290 may enable a match based on a full overlap with the radar detection window and the user selected region 522 but only a partial overlap with the radar detection window. The amount of overlap and/or the combination of overlap with the computer vision detection window, the radar detection window and/or the user selected region 522 may be varied according to the design criteria of a particular implementation.

A processor 102 may be configured to use the coordinate transfer data to compare the location of the computer vision detection window and the radar detection window on the aligned coordinate system. In the example shown, the computer vision detection window may overlap with the radar detection window as shown by the aligned ROI 520. The matching rules 290 may be used to determine whether there is a sufficient amount of overlap between the aligned ROI 520 and the user selected region 522 to perform the additional operations to generate the additional information. In some embodiments, the processor 102 may select a region of interest that comprises only the overlapping portion of the aligned ROI 520 and the user selected region 522 (e.g., discard the radar data in the radar detection window and/or the computer vision results in the computer vision detection window that does not overlap with the user selected region 522). In some embodiments, in response to the overlap detected, the processor 102 may use the entire aligned ROI 520 as the region of interest (e.g., the overlap may be used as a confirm for the match, even if there is not a full overlap). In response to selecting the region of interest based on the overlap between the aligned ROI 520 and the user selected region 522, the processor 102 may generate the additional information. The processor 102 may be configured to limit processing of additional information to the region of interest selected.

The information block 504 may provide an illustrative example of the additional information generated by the processor 102 in response to selecting a region of interest based on the intersection of the aligned ROI 520 and the user selected region 522 (e.g., the match may indicate that the event of interest was successfully detected). The information block 504 may comprise additional information 530*a*-530*c*. The additional information 530*a* may comprise a distance (or range) value. The additional information 530*b* may comprise a height value. The additional information 530*c* may comprise a velocity value. The processor 102 may be configured to generate other types of additional information (not shown). The number, type and/or granularity of the additional information 530*a*-530*c* generated may be varied according to the design criteria of a particular implementation.

In the example shown, the range value 530*a* may comprise a distance measurement of 700 cm. In some embodiments, the range value 530*a* may be determined based on the R measurement in the radar data (e.g., based on spherical coordinates). In some embodiments, the range value 530*a* may be determined in response to the extrinsic matrix 192*c* used to transform the image coordinates of the computer vision detection window to the real-world coordinates.

In the example shown, the height value 530*b* may comprise a height measurement of 148 cm. The height value 530*b* may be determined in response to the highest point of the computer vision detection window as described in association with FIG. 9.

In the example shown, the velocity value 530*c* may comprise a speed measurement of 126 cm/s. In some embodiments, the velocity value 530*c* may be determined in response to an analysis of multiple video frames captured in a sequence. For example, the processor 102 may determine the change in distance covered by the person 512 between video frames based on the frame rate.

Figure 11:
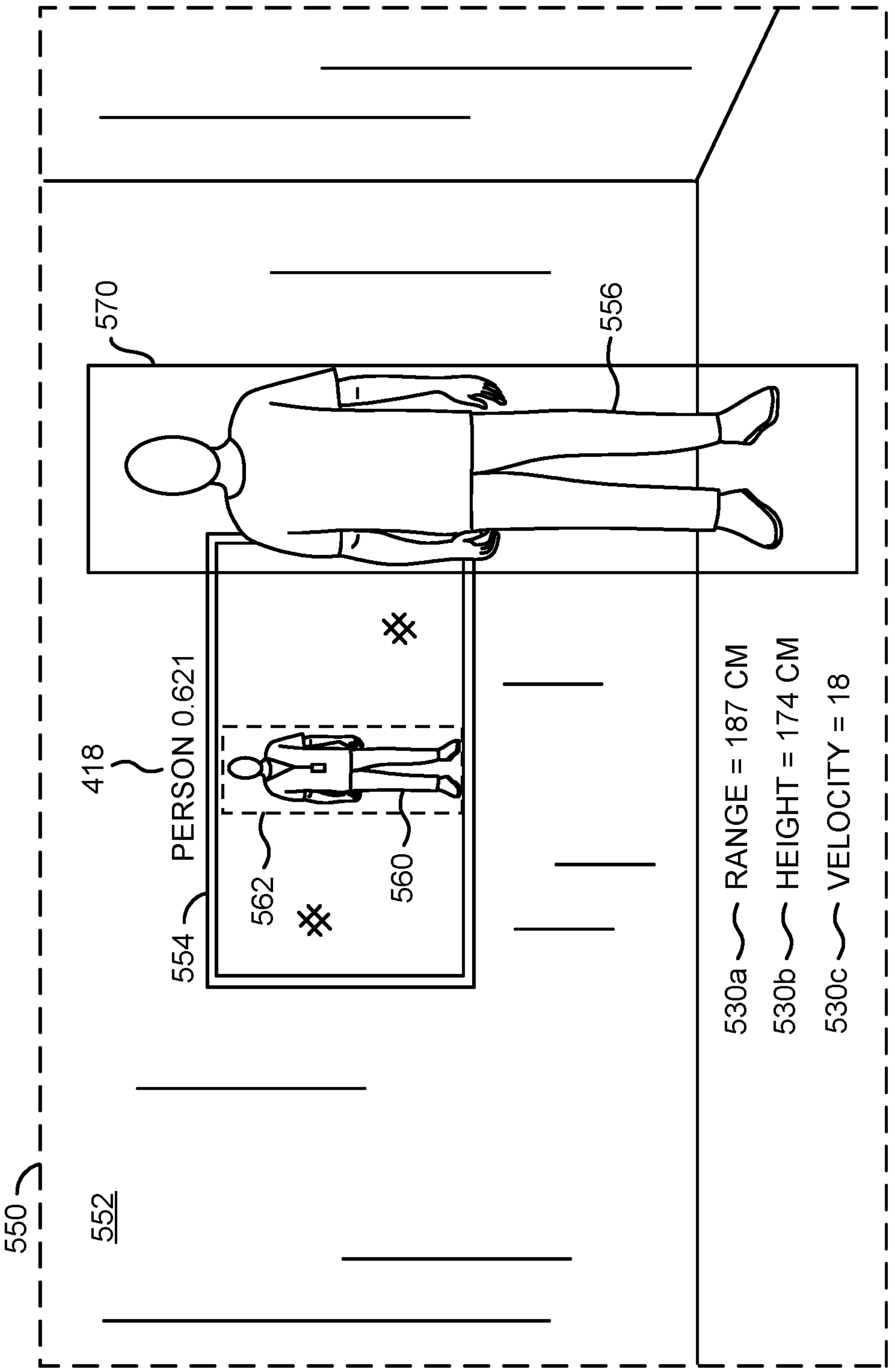
FIG. 11 is a diagram illustrating an example of detection of an object using matching rules.

Referring to FIG. 11, a diagram illustrating an example of detection of an object using matching rules is shown. An example video frame 550 is shown. The example video frame 550 may comprise a field of view of an indoor room 552. The processor 102 may be configured to merge computer vision results, radar data results and matching rules 290 to detect particular objects (e.g., events of interest), while ignoring other types of objects.

The example video frame 550 may comprise a display monitor 554 and/or a person 556. The display monitor 554 may be a TV screen displaying a 2D image. A 2D representation of a person 560 is shown output on the display monitor 554. In some embodiments, the 2D representation of a person 560 may be an image of the person 556. In some embodiments, the 2D representation of a person 560 may be an image of a different person than the person 556.

The processor 102 may perform the computer vision operations on the video frame 550. Computer vision operations using the single lens 160 may detect 2D objects and 3D objects as an object of interest (e.g., computer vision operations based on a monocular image may not be capable of distinguishing between a 3D object and a 2D representation of the object). In the example shown, a bounding box 562 is shown around the 2D representation of a person 560 on the display monitor 554. Using the computer vision results only may result in detecting the 2D representation of a person 560 as a live person. The classification result 418 is shown for the bounding box 562. In the example shown, the computer vision results may have classified the 2D representation of a person 560 as a person with a confidence level of 0.621.

A bounding box 570 is shown. The bounding box 570 may correspond to the person 556. The computer vision operations may detect the person 556 as an object of interest. For example, the computer vision operations may detect both the person 556 and the 2D representation of the person 560 as an object of interest. In the example shown, the bounding box 570 may represent an intersection of the location of the computer vision result and the radar detection result on the aligned coordinate system.

The radar data results may not detect an object at the location of the bounding box 562. For example, since the 2D representation of the person 560 is not a 3D object, the processor 102 may not provide a positive result at the location of the bounding box 562. Similarly, since the person 556 is a 3D object, the processor 102 may provide a positive result at the location of the bounding box 570 for the person 556.

The processor 102 may determine whether there is an intersection between the computer vision detection results and the radar detection results in response to the matching rules 290. In the example shown, the processor 102 may determine that there is not an intersection between the bounding box 562 and the radar data. In response to the determination of no intersection, the processor 102 may discard the computer vision result at the bounding box 562 (or ignore the computer vision result at the bounding box 562 when performing additional processing). In response to determining the intersection at the location of the bounding box 570, the processor 102 may determine the additional information for the person 556. The processor 102 may perform the additional processing on the location of the bounding box 570 to generate the additional information 530*a*-530*c*.

In the example shown, the additional information 530*a*-530*c* may comprise a range of 187 cm, a height of 174 cm and a velocity of 18. The matching rules 290 implemented by the processor 102 may enable the detection of a live and/or moving person while ignoring false positives. In the example shown, the false positive may be the 2D representation of the person 562. In the example shown, the matching rules 290 may detect an object for additional processing if the object is live (e.g., 3D). For example, the matching rules 290 may enable the processor 102 to distinguish between a 2D object and a 3D object to detect the event of interest.

Figure 12:
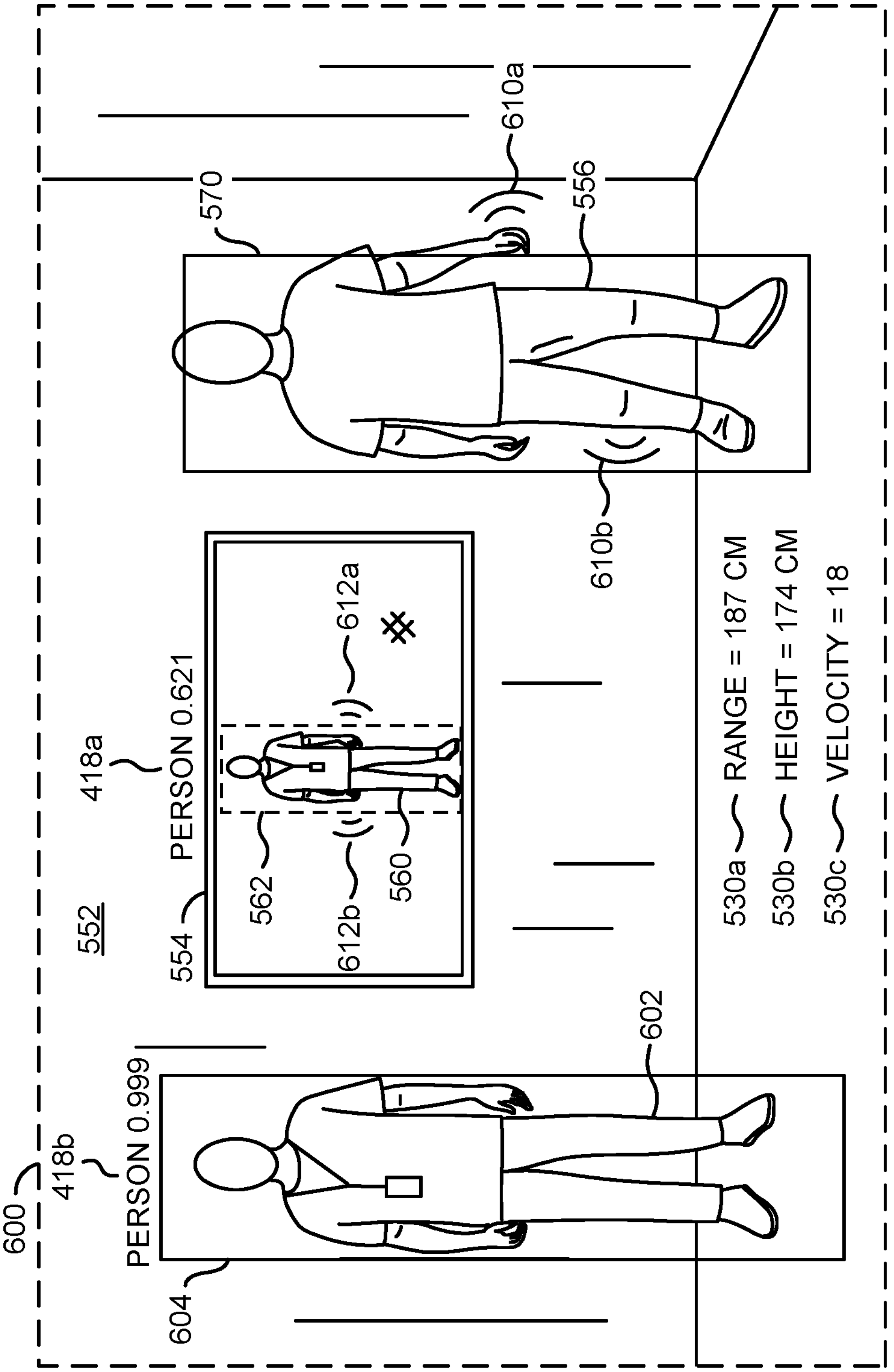
FIG. 12 is a diagram illustrating an alternate example of detection of an object using matching rules.

Referring to FIG. 12, a diagram illustrating an alternate example of detection of an object using matching rules is shown. An example video frame 600 is shown. The example video frame 600 may comprise a field of view of the indoor room 552. The processor 102 may be configured to merge computer vision results, radar data results and matching rules 290 to detect particular objects as the event(s) of interest, while ignoring other types of objects.

The example video frame 600 may comprise the display monitor 554, the person 556 and/or a person 602. The 2D representation of a person 560 is shown output on the display monitor 554. A bounding box 604 is shown around the person 602. Curved lines 610*a*-610*b* are shown extending from the person 556. The curved lines 610*a*-610*b* may illustrate that the person 556 is moving (e.g., walking, jumping, bouncing, etc.). Curved lines 612*a*-612*b* are shown around the 2D representation of a person 560. The curved lines 612*a*-612*b* may illustrate the 2D representation of a person 560 is moving (e.g., a video playing on the display monitor 554 of a person walking, jumping, bouncing, etc.). The person 602 is shown without curved lines (e.g., the person 602 may be standing still, the person 602 may be a mannequin, etc.). In the example shown, the person 556 may be a moving person, the 2D representation of a person 560 may be a moving person and the person 602 may be a still person.

The processor 102 may perform the computer vision operations on the video frame 600. Computer vision operations using the single lens 160 may detect 2D objects, 3D objects, moving objects and/or stationary objects as an object of interest. In the example shown, the bounding box 562 is shown around the 2D representation of a moving person 560 and the bounding box 604 is shown around the still person 602. Using the computer vision results only may result in detecting the 2D representation of a moving person 560 as a person and the still person 602 as a person. The classification result 418*a* is shown for the bounding box 562 and the classification result 418*b* is shown for the bounding box 604. In the example shown, the computer vision results may have classified the 2D representation of a person 560 as a person with a confidence level of 0.621. In the example shown, the computer vision results may have classified the still person 602 as a person with a confidence level of 0.999.

The computer vision operations may detect each of the moving person 556, the 2D representation of a moving person 560 and the still person 602 as an object of interest. The radar data results may not detect an object at the location of the bounding box 562. For example, since the 2D representation of the moving person 560 is not a 3D object, the processor 102 may not provide a positive result at the location of the bounding box 562. The radar data may not detect an object at the location of the bounding box 604. For example, since the still person 602 is not moving, the processor 102 may not provide a positive result at the location of the bounding box 604. Similarly, since the moving person 556 is a 3D object and is moving, the processor 102 may provide a positive result at the location of the bounding box 570 for the person 556.

The processor 102 may determine whether there is an intersection between the computer vision detection results and the radar detection results in response to the matching rules 290. In the example shown, the processor 102 may determine that there is not an intersection between either the bounding box 562 and the radar data because of the 3D liveness criteria in the matching rules 290 or the bounding box 604 and the radar data because of the movement criteria in the matching rules 290 (or the inability of the radar module 106 to detect a static object). In response to the determination of no intersection, the processor 102 may discard the computer vision result at the bounding box 562 (or ignore the computer vision result at the bounding box 562 when performing additional processing) and may discard the computer vision result at the bounding box 604 (or discard the computer vision result at the bounding box 604 when performing additional processing). In response to determining the intersection at the location of the bounding box 570, the processor 102 may determine the additional information for the person 556. The processor 102 may perform the additional processing on the location of the bounding box 570 to generate the additional information 530*a*-530*c*.

In the example shown, the additional information 530*a*-530*c* may comprise a range of 187 cm, a height of 174 cm and a velocity of 18. The matching rules 290 implemented by the processor 102 may enable the detection of a live and/or moving person as the event of interest while ignoring false positives. In the example shown, the false positive may be the 2D representation of the moving person 562. In the example shown, the false positive may be the still person 602. In the example shown, the matching rules 290 may detect an object for additional processing if the object is live (e.g., 3D) and moving.

Figure 13:
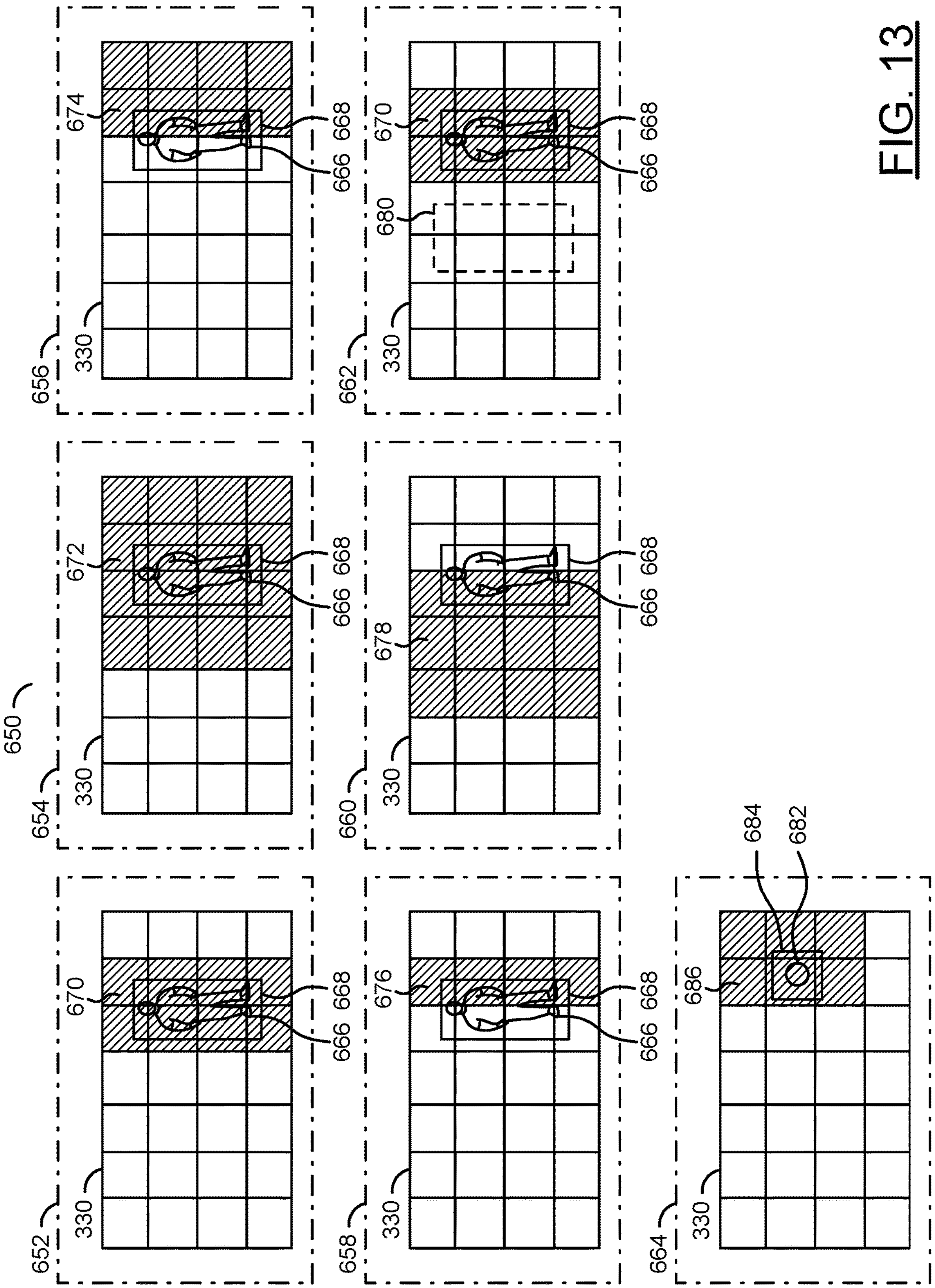
FIG. 13 is a diagram illustrating matching rules.

Referring to FIG. 13, a diagram illustrating matching rules is shown. Examples of matching rules application 650 is shown. The matching rules application 650 may provide a number of examples of applying the matching rules 290 to the computer vision detection results and the radar detection results. The examples of matching rules application 650 may comprise a number of fused sensor data scenario 652-664. Each of the fused sensor data scenarios 652-664 may comprise the fused data 330 comprising computer vision detection results and the radar detection results transformed to be aligned on the same coordinate system (e.g., the image coordinate system 312).

The fused sensor data scenario 652 may comprise the fused data 330 comprising a detected person 666, a computer vision detection window 668 and a radar detection result 670. In the fused sensor data scenario 652, the location of the computer vision detection window 668 may have a near perfect match with the location of the radar detection result 670. For example, the computer vision detection window 668 may be within the valid area of the radar detection result 670 with a negligible amount of excess coverage. The processor 102 may apply the matching rules 290 to the fused sensor data scenario 652 and determine that there is a match (e.g., an event of interest has been detected).

The fused sensor data scenario 654 may comprise the fused data 330 comprising the detected person 666, the computer vision detection window 668 and a radar detection result 672. In the fused sensor data scenario 654, the location of the computer vision detection window 668 may have a match with the location of the radar detection result 672. For example, the computer vision detection window 668 may be within the valid area of the radar detection result 672, but the radar detection result 672 may cover a larger region than the computer vision detection window 668 (e.g., a significant amount of excess coverage). The matching rules 290 may comprise a threshold value that may define an amount of acceptable excess coverage. The processor 102 may apply the matching rules 290 to the fused sensor data scenario 652 and determine whether there is a match (e.g., an acceptable intersection) depending on the threshold value for excess coverage.

The fused sensor data scenario 656 may comprise the fused data 330 comprising the detected person 666, the computer vision detection window 668 and a radar detection result 674. In the fused sensor data scenario 656, the location of the computer vision detection window 668 may have a partial match with the location of the radar detection result 674. For example, the computer vision detection window 668 may be partially within the valid area of the radar detection result 674, but the valid area of the radar detection result 674 may cover a region that does not overlap with the computer vision detection window 668 (e.g., partial overlap with excess coverage). The matching rules 290 may comprise a threshold value that may define an amount of acceptable excess coverage and an amount of acceptable partial overlap. In the example shown, the partial overlap may be approximately 50%. The processor 102 may apply the matching rules 290 to the fused sensor data scenario 656 and determine whether there is a match (e.g., an acceptable intersection) depending on the threshold value for excess coverage and the threshold value for partial coverage.

The fused sensor data scenario 658 may comprise the fused data 330 comprising the detected person 666, the computer vision detection window 668 and a radar detection result 676. In the fused sensor data scenario 658, the location of the computer vision detection window 668 may have a partial match with the location of the radar detection result 678. For example, the valid area of the radar detection result 674 may be partially within the computer detection window 668, with no excess coverage by the radar detection result 678 (e.g., partial overlap). The matching rules 290 may comprise a threshold value that may define an amount of acceptable partial overlap. In the example shown, the partial overlap may be approximately 50%. The processor 102 may apply the matching rules 290 to the fused sensor data scenario 658 and determine whether there is a match (e.g., an acceptable intersection) depending on the threshold value for partial coverage.

The fused sensor data scenario 660 may comprise the fused data 330 comprising the detected person 666, the computer vision detection window 668 and a radar detection result 678. In the fused sensor data scenario 660, the location of the computer vision detection window 668 may have a partial match with the location of the radar detection result 678. For example, the computer vision detection window 668 may be partially within the valid area of the radar detection result 674, but the radar detection result 678 may cover a region that does not overlap with the computer vision detection window 668 (e.g., less partial overlap than excess coverage). The matching rules 290 may comprise the threshold value that may define an amount of acceptable excess coverage and the amount of acceptable partial overlap. The matching rules 290 may further comprise a threshold value for a ratio of excess coverage to partial coverage. In the example shown, the partial overlap may be approximately 50%, and the ratio of overlap to excess coverage may be 1:2 (e.g., one third of the radar detection result 678 overlaps with the computer vision detection window 668 and two thirds of the radar detection result 678 does not overlap). The processor 102 may apply the matching rules 290 to the fused sensor data scenario 660 and determine whether there is a match (e.g., an acceptable intersection)

depending on the threshold value for excess coverage, the threshold value for partial coverage and/or the threshold value for the ratio of excess coverage.

The fused sensor data scenario 662 may comprise the fused data 330 comprising the detected person 666, the computer vision detection window 668, the radar detection result 670, and a defined region 680. In the fused sensor data scenario 662, the location of the computer vision detection window 668 may have a near perfect match with the location of the radar detection result 670. For example, the computer vision detection window 668 may be within the valid area of the radar detection result 670 with a negligible amount of excess coverage. However, the computer vision detection window 668 and the radar detection result 670 may be outside of the defined region 680. The defined region 680 may be part of the matching rules 290. For example, the defined region 680 may provide limitations for a match (e.g., the overlapping region of the computer vision detection window 668 and the radar detection result 670 may not be a match unless within the defined region 680). The matching rules 290 may provide a threshold value for an amount of overlap to be within the defined region 680. The processor 102 may apply the matching rules 290 to the fused sensor data scenario 662 and determine that there is no match (e.g., no acceptable intersection) since all the detection data is outside of the defined region 680.

The fused sensor data scenario 664 may comprise the fused data 330 comprising a detected object 682, a computer vision detection window 684 and a radar detection result 686. In the fused sensor data scenario 664, the location of the computer vision detection window 684 may have a near perfect match with the location of the valid area of the radar detection result 686. The matching rules 290 may comprise an object size threshold value. The detected object 682 may be smaller than the detected person 666. For example, even with a near perfect match and with the overlap within a defined region, the match may still fail based on the small size of the detected object 682. The processor 102 may apply the matching rules 290 to the fused sensor data scenario 664 and determine whether there is a match (e.g., an acceptable intersection) based on the object size threshold value.

The example fused sensor data scenarios 652-664 may provide illustrative examples of a subset of the matching rules 290. The matching rules 290 may further comprise a distance threshold value (e.g., the distance R from the radar data may be used as a match limitation). For example, the detected object may need to be within 2 meters of the edge devices 100*a*-100*n*. The type and/or combination of the matching rules 290 to apply to determine a positive match for an event of interest may be varied according to the design criteria of a particular implementation.

Figure 14:
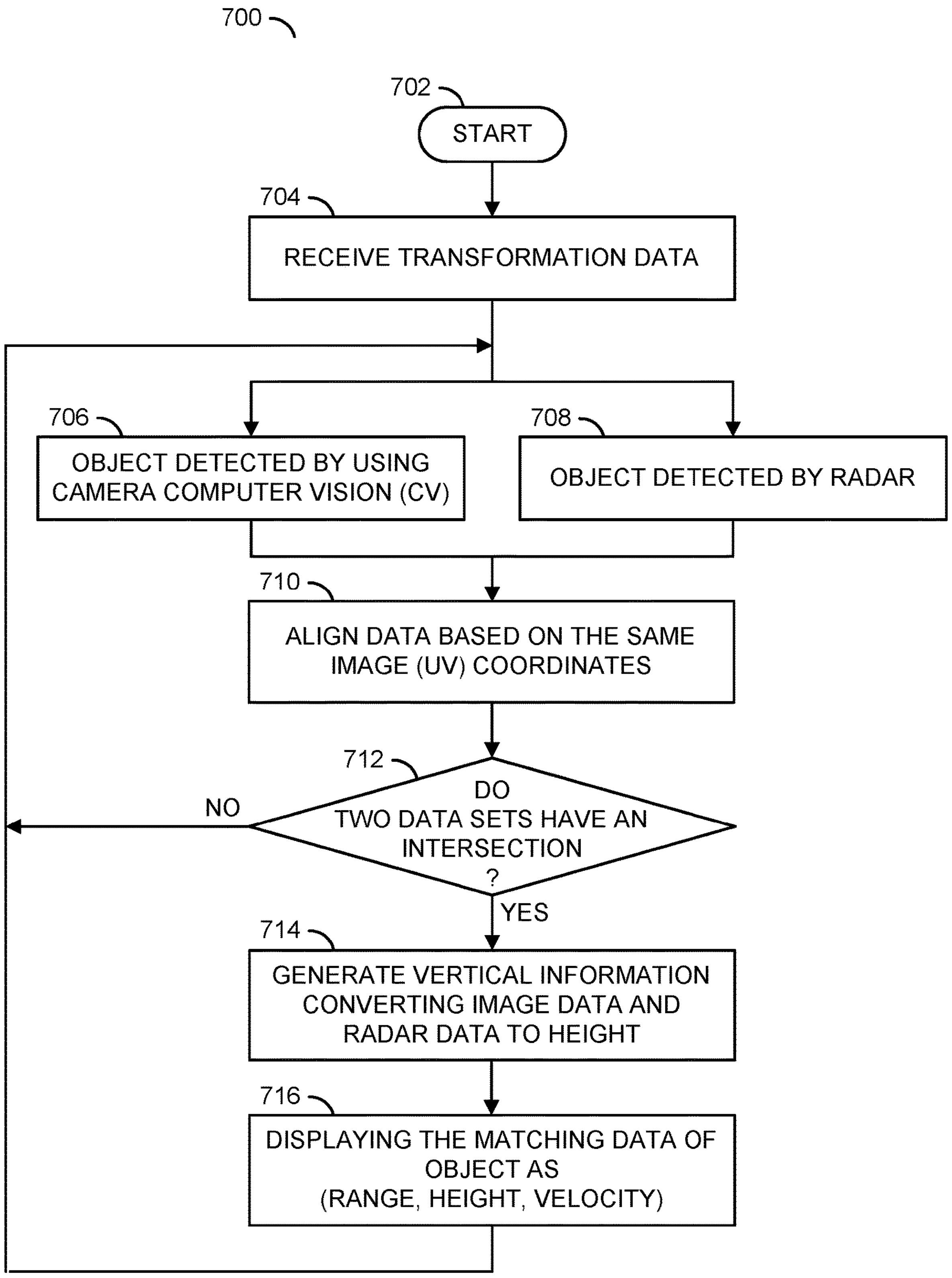
FIG. 14 is a flow diagram illustrating a method for fusing objects detected by radar without height information to the object captured by a single lens camera.

Referring to FIG. 14, a method (or process) 700 is shown. The method 700 may fuse objects detected by radar without height information to the object captured by a single lens camera. The method 700 generally comprises a step (or state) 702, a step (or state) 704, a step (or state) 706, a step (or state) 708, a step (or state) 710, a decision step (or state) 712, a step (or state) 714, and a step (or state) 716.

The step 702 may start the method 700. In the step 704, the processor 102 may receive the transformation data. The transformation data may comprise the radar mapping function 194*c* and/or the extrinsic matrix 192*c*. Next, the method 700 may move to the steps 706-708. Generally, the steps 706-708 may be performed in parallel and/or substantially in parallel. In the step 706, the capture device 104 may capture pixel data of the environment and the processor 102 may process the pixel data arranged as video frames and/or perform computer vision operations. The computer vision operations performed by the CNN module 190*b* may be used to detect an object (e.g., determine the location of the computer vision detection window). Next, the method 700 may move to the step 710. In the step 708, the radar module 106 may generate radar data, and the processor 102 may perform radar signal processing to determine a location of the objects based on the radar coordinates. Next, the method 700 may move to the step 710. In the step 710, the processor 102 may use the transformation data to align the computer vision detection window data and the radar detection data on the same coordinates. For example, the data may be aligned on the image coordinates (U,V) system 312. Next, the method 700 may move to the decision step 712.

In the decision step 712, the processor 102 may determine whether the two sets of data have an intersection. The matching rules 290 may be used to determine an acceptable amount of overlap between the data sets on the aligned coordinate system. If there is not an intersection, then the method 700 may return to the steps 706-708. For example, with no intersection, the object may be ignored. If there is an intersection, then the method 700 may move to the step 714.

In the step 714, the processor 102 may generate vertical information by converting the image data and the radar data to height information. Next, in the step 716, the processor 102 may determine the additional information 530*a*-530*c* about the detected object. In an example, the processor 102 may determine a range, a height and/or a velocity of the detected object. The additional information 530*a*-530*b* generated may be displayed on the video frames. Next, the method 700 may return to the steps 706-708.

Figure 15:
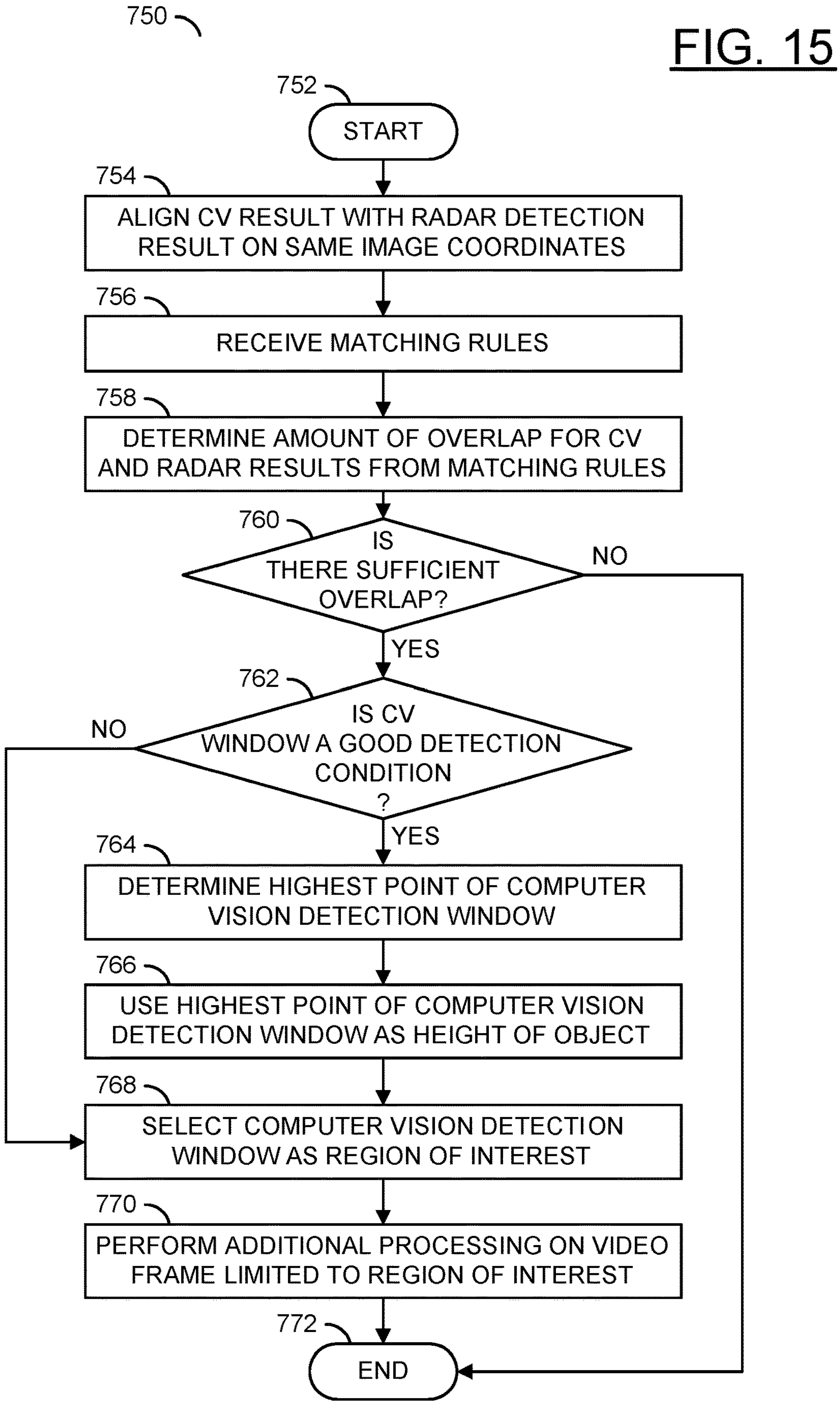
FIG. 15 is a flow diagram illustrating a method for detecting a height of an object.

Referring to FIG. 15, a method (or process) 750 is shown. The method 750 may detect a height of an object. The method 750 generally comprises a step (or state) 752, a step (or state) 754, a step (or state) 756, a step (or state) 758, a decision step (or state) 760, a decision step (or state) 762, a step (or state) 764, a step (or state) 766, a step (or state) 768, a step (or state) 770, and a step (or state) 772.

The step 752 may start the method 750. In the step 754, the processor 102 may align the computer vision result (e.g., the computer vision detection window 414 with the radar detection result (e.g., the radar detection location 430) on the same coordinate system (e.g., the image coordinate system 312). For example, the radar detection location 430 may be transformed to the image coordinate system 312 using the radar mapping function 194*c*. Next, in the step 756, the processor 102 may receive the matching rules 290. In an example, the matching rules 290 may be stored in the memory 150. In the step 758, the processor 102 may determine an amount of overlap for the computer vision result and the radar detection results from the matching rules 290. For example, the matching rules 290 may comprise an overlap threshold value comprising a minimum amount of overlap for the computer vision detection result and the radar detection result to be considered to be intersecting (e.g., a 20% overlap, a 50% overlap, a 60% overlap, a 100% overlap, etc.). Next, the method 750 may move to the decision step 760.

In the decision step 760, the processor 102 may determine whether there is a sufficient amount of overlap between the location of the computer vision detection result and the location of the radar detection result. In an example, the processor 102 may determine the amount of overlap between the locations of the computer vision detection window 668, and the radar detection result 670 as shown in association with FIG. 13, and compare the amount of overlap with overlap threshold in the matching rules 290. If there is not a sufficient amount of overlap, then the method 750 may move to the step 772. For example, without a sufficient amount of overlap, the detection of the object may be ignored. If there is a sufficient amount of overlap, then the method 750 may move to the decision step 762.

In the decision step 762, the processor 102 may determine whether the CV window provides a good detection condition. In an example, if the CV detection window 668, provides the bad detection condition 416, then the CV detection window 668 may be unsuitable for determining a height of the detected object 666. In one example, whether the CV detection window 668 provides a good detection condition or the bad detection condition 416 may be determined based on the classification result 418 (e.g., the bad detection condition 416 may not classify the detected object as a person with a high level of confidence). In another example, whether the CV detection window 668 provides a good detection condition or the bad detection condition 416 may be determined by comparing the height of the radar detection results with the height of the CV detection window 668. If the CV window does not provide a good detection condition, the method 750 may move to the step 768 (e.g., skip the steps 764-766 for determining the height of the detected object). If the CV window does provide a good detection condition, then the method 750 may move to the step 764.

In the step 764, the processor 102 may determine the highest point position 466 of the computer vision detection window 668. Next, in the step 766, the processor 102 may convert the highest point position 466 from the image coordinate system 312 to the real world environment coordinate system to use the highest point position 466 as the height of the detected object. Next, the method 750 may move to the step 768.

In the step 768, the processor 102 may select the computer vision detection window 668 as the region of interest. Next, in the step 770, the processor 102 may perform additional processing on the captured video frame(s). The additional processing may be limited to the region of interest. For example, the processor 102 may not perform the additional processing on the other portions of the video frame to conserve resources. The additional processing may comprise white balance, auto-exposure, bitrate control, image signal processing enhancements, etc. Next, the method 750 may move to the step 772. The step 772 may end the method 750.

Figure 16:
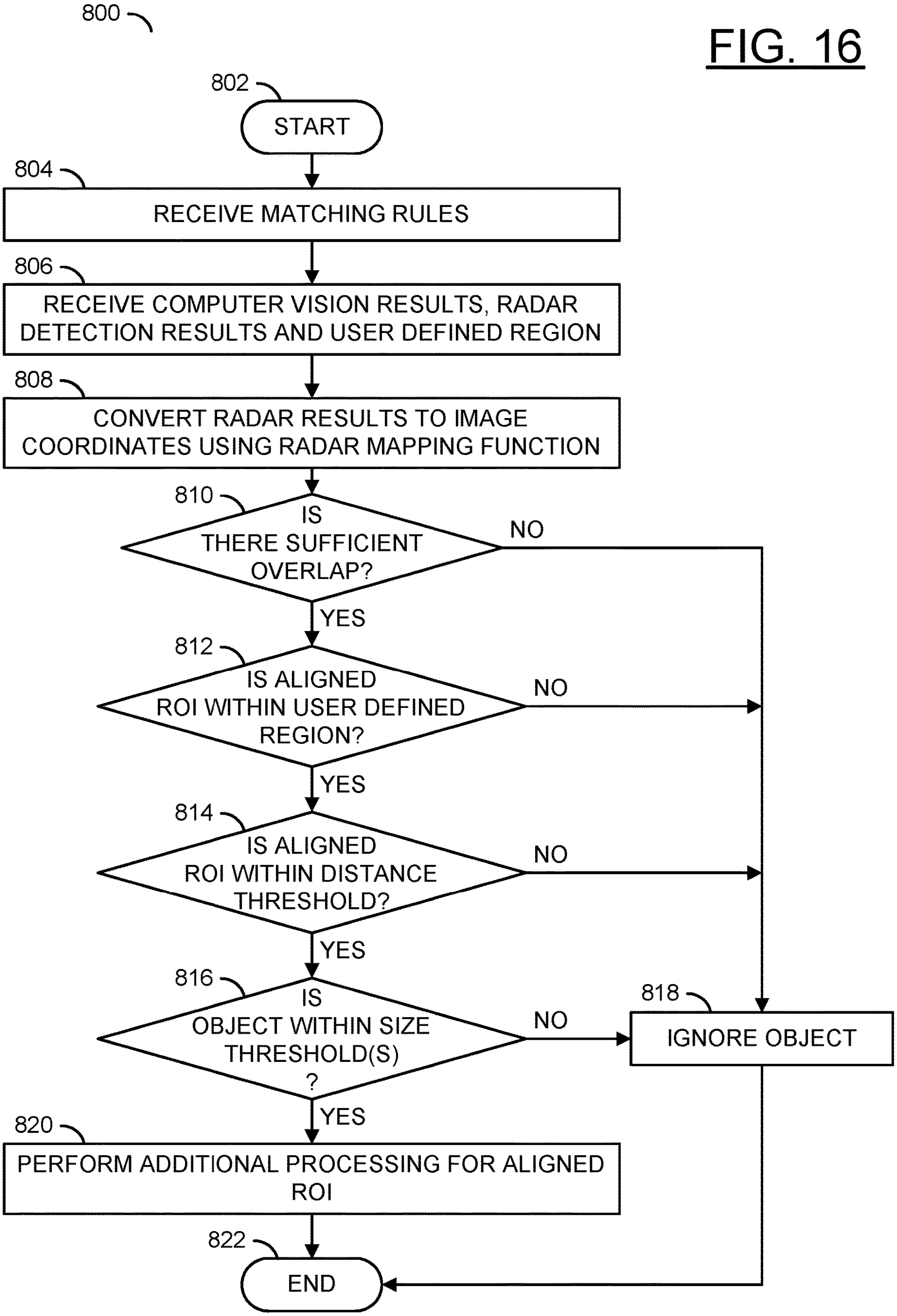
FIG. 16 is a flow diagram illustrating a method for applying matching rules to computer vision results and radar detection results.

Referring to FIG. 16, a method (or process) 800 is shown. The method 800 may apply matching rules to computer vision results and radar detection results. The method 800 generally comprises a step (or state) 802, a step (or state) 804, a step (or state) 806, a step (or state) 808, a decision step (or state) 810, a decision step (or state) 812, a decision step (or state) 814, a decision step (or state) 816, a step (or state) 818, a step (or state) 820, and a step (or state) 822.

The step 802 may start the method 800. In the step 804, the processor 102 may receive the matching rules 290. Next, in the step 806, the processor 102 may receive the computer vision results 668, the radar detection results 670 and the user defined region 522. In the step 808, the processor 102 may use the radar mapping function 194*c* to convert the radar results to the image coordinate system 312 to provide the aligned coordinate system. Next, the method 800 may move to the decision step 810.

In the decision step 810, the processor 102 may determine whether there is a sufficient amount of overlap between the location of the computer vision detection window and the location of the radar detection window on the aligned coordinate system. For example, the matching rules 290 may provide the overlap threshold. If there is not a sufficient amount of overlap, then the method 800 may move to the step 818. If there is a sufficient amount of overlap, then the method 800 may move to the decision step 812.

In the decision step 812, the processor 102 may determine whether the aligned ROI (e.g., the intersection between the location of the computer vision detection window 668 and the radar detection results 670) is within the user defined region 522. For example, the matching rules 290 may provide the coordinate range of the user defined region 522. If the aligned ROI is not within the user defined region 522, then the method 800 may move to the step 818. If the aligned ROI is within the user defined region 522, then the method 800 may move to the decision step 814.

In the decision step 814, the processor 102 may determine whether the aligned ROI (e.g., the intersection between the location of the computer vision detection window 668 and the radar detection results 670) is within the distance threshold(s). For example, the matching rules 290 may provide a maximum and/or a minimum distance from the edge device 100*i*. If the aligned ROI is not within the distance threshold (s), then the method 800 may move to the step 818. If the aligned ROI is within the distance threshold(s), then the method 800 may move to the decision step 816.

In the decision step 816, the processor 102 may determine whether the size of the detected object is within a size threshold. For example, the matching rules 290 may provide a maximum and/or a minimum object size for the detected object. If the object size is larger than or smaller than the object size thresholds, then the method 800 may move to the step 818. If the object size is within the object size threshold (s), then the method 800 may move to the step 820.

In the step 818, the processor 102 may ignore the detected object. For example, if the object does not comply with the matching rules 290, then the processor 102 may not determine the additional information 530*a*-530*c* and/or perform the additional processing. For example, the detected object may not be the event of interest. Next, the method 800 may move to the step 822.

In the step 820, the processor 102 may perform the additional processing for the aligned ROI. For example, the processor 102 may determine the additional information 530*a*-530*c* for the detected object and/or limit the additional processing to the location of the aligned ROI. Next, the method 800 may move to the step 822. The step 822 may end the method 800.

The decision steps 810-816 may provide examples of applying the matching rules 290. The particular order and/or the number of the matching rules 290 may be varied according to the design criteria of a particular implementation. For example, the object size threshold and be determined without first determining the amount of overlap.

Figure 17:
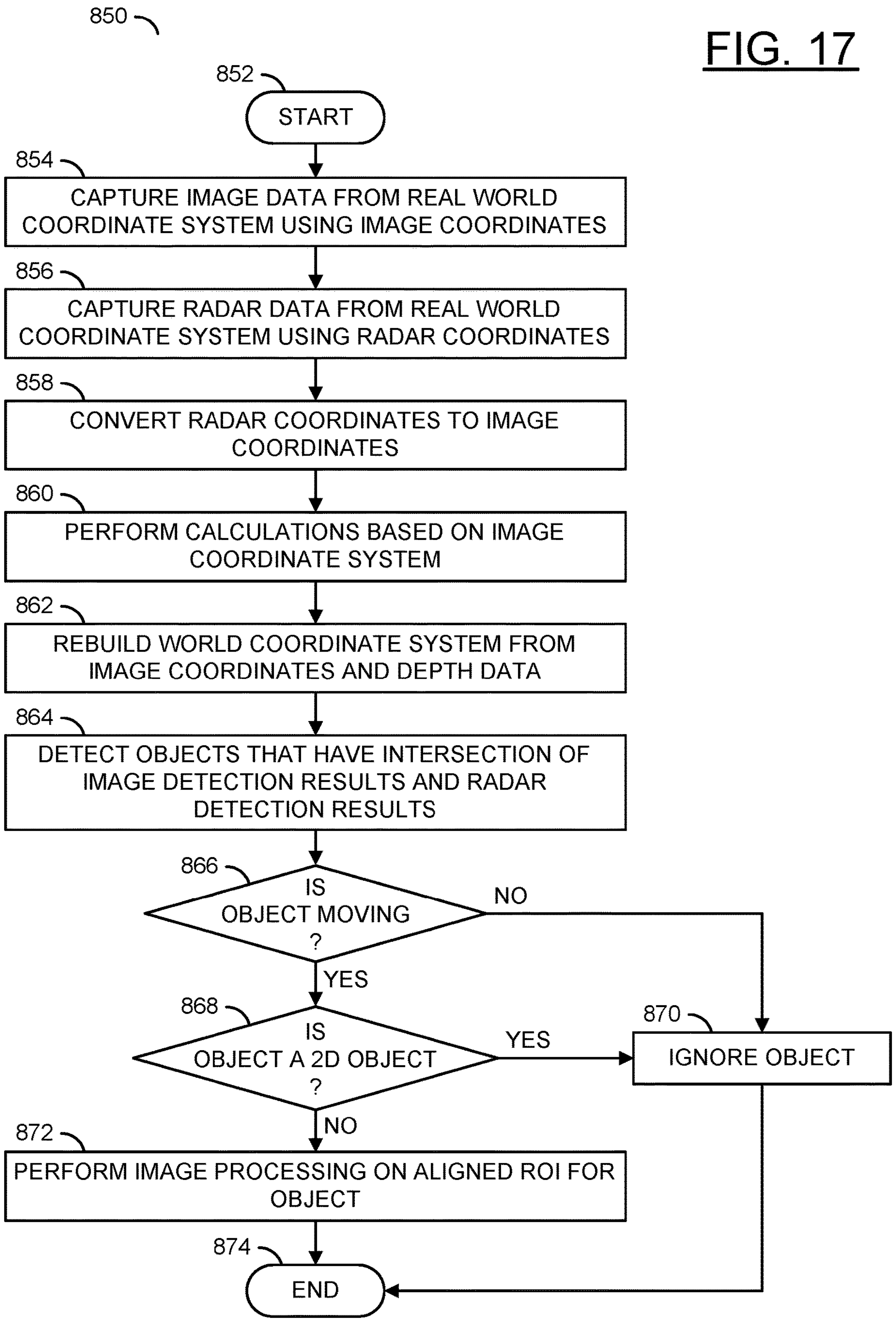
FIG. 17 is a flow diagram illustrating a method for rebuilding a world coordinate system.

Referring to FIG. 17, a method (or process) 850 is shown. The method 850 may rebuild a world coordinate system. The method 850 generally comprises a step (or state) 852, a step (or state) 854, a step (or state) 856, a step (or state) 858, a step (or state) 860, a step (or state) 862, a step (or state) 864, a decision step (or state) 866, a decision step (or state) 868, a step (or state) 870, a step (or state) 872, and a step (or state) 874.

The step 852 may start the method 850. In the step 854, the capture device 104 may capture image data from the real world coordinate system using the image coordinates. For example, capturing the pixel data may provide a two-dimensional image that may be a projection of the real-world three-dimensional scene onto the same plane (e.g., defined by the U,V image coordinates) without depth data.

Next, in the step 856, the radar module 106 may capture the radar data from the real world coordinate system using the radar coordinates. For example, the radar data may provide information about the object in the spherical and/or Cartesian coordinate system and/or provide depth data. In the step 858, the processor 102 may convert the radar coordinates to the image coordinate system 312 using the radar mapping function 194*c*. Next, in the step 860, the processor 102 may perform calculations based on the image coordinate system 312. In the step 862, the processor 102 may rebuild the world image coordinate system from the image coordinates and the depth data. For example, in the transformation matrix (e.g., the extrinsic matrix 192*c*), the processor 102 may determine the Z (e.g., depth) data in order to transform the U,V and Z data into X,Y,Z coordinates. After fusing the computer vision data and the radar data, the processor 102 may acquire the depth data (Z data) of the object. The processor 102 may then back-project the data onto the real world coordinate system (e.g., the X,Y,Z coordinates). Next, in the step 864, the processor 102 may detect objects that have an intersection of the image detection results the radar detection results. Next, the method 850 may move to the decision step 866.

In the decision step 866, the processor 102 may determine whether the detected object(s) are moving. In one example, the radar detection results may detect moving objects. Whether the object is moving or static may be one of the thresholds of the matching rules 290. If the object is not moving, then the method 850 may move to the step 870. If the object is moving, then the method 800 may move to the decision step 868.

In the decision step 868, the processor 102 may determine whether the detected object(s) are 2D objects or 3D objects. For example, a combination of the radar detection results and the computer vision results may provide information to determine a liveness of the objects and/or determine whether the object is a 2D object or a 3D object. In one example, radar detection results may provide a power value (e.g., from the radar results 434). A change in the power value may provide one type of data that may be used as a coarse accuracy level for detecting object liveness. In another example, some implementations of the radar module 106 may be configured to detect vital signs. Combining the radar detection results with the computer vision results may provide additional data to determine liveness. In one example, the computer vision results may provide data that may be used to determine liveness, such as motion information, blink analysis, eye movement analysis, human body skeleton analysis, etc. Generally, at least the depth data from the radar detection results may be combined with the computer vision results to determine liveness and/or whether the object is a 2D object or a 3D object. If the objects are 2D objects, then the method 850 may move to the step 870. In the step 870, the processor 102 may ignore the detected object. Next, the method 850 may move to the step 874.

In the decision step 868, if one of the objects is a 3D object, then the method 850 may move to the step 872. In the step 872, the processor 102 may perform additional image processing and/or determine the additional information 530*a*-530*c* on the aligned ROI for the object that met the criteria for the matching rules 290. Next, the method 850 may move to the step 874. The step 874 may end the method 850.

The functions performed by the diagrams of FIGS. 1-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMS (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive (i) pixel data from a single lens camera and (ii) radar data without height information; and a processor configured to (i) process said pixel data arranged as video frames, (ii) receive coordinate transformation data for an image sensor and a radar device, (iii) determine a first object detection location in said video frames in response to computer vision operations, (iv) determine a second object detection location in said radar data, (v) determine if there is a sufficient amount of overlap of an intersection of said first object detection location and said second object detection location in response to (a) a comparison of a transformation of said first object detection location and said second object detection location to an aligned coordinate system and (b) matching rules, (vi) determine a detection condition of said computer vision operations in response to a size of an object detection window, (vii) determine an object height in response to said detection condition and a center pixel of a highest point of said object detection window, (viii) select a region of interest in response to said matching rules and (ix) generate information about an object in response to said intersection and said region of interest, wherein (a) said transformation is performed on said first object detection location and said second object detection location using said coordinate transformation data to compare said first object detection location and said second object detection location on said aligned coordinate system, (b) said information about said object comprises a range from said apparatus and an object velocity determined from said radar data converted to a coordinate system of said video frames, and (c) video processing limited to said region of interest is performed on said video frames.

2. The apparatus according to claim 1, wherein said information further comprises said object height.

3. The apparatus according to claim 1, wherein (i) said center pixel of said highest point of said object detection window detected using said computer vision operations in image coordinates, (ii) said radar data is converted to said image coordinates and (iii) and said range is determined in response to a range coordinate value from said radar data that corresponds to said center pixel.

4. The apparatus according to claim 1, wherein said object is ignored if said comparison does not detect said sufficient amount of said overlap of said intersection defined by said matching rules.

5. The apparatus according to claim 1, wherein said sufficient amount of said overlap of said intersection corresponds to an amount that a bounding box of said object detected using said computer vision operations overlaps with a valid radar detection area of said object detected based on processing said radar data.

6. The apparatus according to claim 1, wherein said matching rules further comprise detecting motion of said object and ignoring a detection without said motion.

7. The apparatus according to claim 6, wherein said matching rules are configured to distinguish between a static object and a moving object.

8. The apparatus according to claim 1, wherein said matching rules are configured to distinguish between a 3D object in an environment from a 2D representation of said object and ignore said 2D representation of said object.

9. The apparatus according to claim 1, wherein said object height, said object velocity, and said range to said object are output onto a display of said video frames after said video processing limited to said region of interest is performed on said video frames.

10. The apparatus according to claim 1, wherein said coordinate transformation data is configured to rebuild an environment coordinate system in response to image coordinates and radar depth data.

11. The apparatus according to claim 10, wherein said image coordinates comprise a two dimensional coordinate location of said video frames and said radar depth data and environment coordinates of said environment coordinate system comprise a three dimensional coordinate of a location in an environment captured by said apparatus.

12. The apparatus according to claim 1, wherein said coordinate transformation data is configured to map radar coordinates of said object generated from said radar data to image coordinates of said object generated from said video frames.

13. The apparatus according to claim 1, wherein said coordinate transformation data is configured to enable a fusion of a vision field of view with a radar field of view.

14. The apparatus according to claim 1, wherein said radar data is generated by a non-automotive mmWave Radar.

15. The apparatus according to claim 1, wherein said matching rules define said region of interest as said first object detection location in said video frames in response to detecting said sufficient amount of said overlap of said intersection.

16. The apparatus according to claim 1, wherein said video processing comprises at least one of bitrate control, exposure adjustment, image signal processing enhancements, and artificial intelligence enhancements.

17. The apparatus according to claim 1, wherein (i) said matching rules comprise a defined region of said aligned coordinate system and (ii) said processor is configured to determine whether said intersection is within said defined region of said aligned coordinate system.

18. The apparatus according to claim 1, wherein said matching rules further comprise (i) a distance of said intersection from said apparatus and (ii) a size threshold of said object.

19. The apparatus according to claim 1, wherein said matching rules define said region of interest in response to a user input.

* * * * *